United States Patent
Kim et al.

(10) Patent No.: US 10,474,264 B2
(45) Date of Patent: Nov. 12, 2019

(54) DISPLAY DEVICE

(71) Applicant: Samsung Display Co., Ltd., Yongin-si (KR)

(72) Inventors: Kwan Ho Kim, Yongin-si (KR); Ja Seung Ku, Yongin-si (KR); Jin Hee Park, Yongin-si (KR); Ho Seok Son, Yongin-si (KR); Jang Doo Lee, Yongin-si (KR); Sung Yeon Cho, Yongin-si (KR); Jae Hyung Cho, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 197 days.

(21) Appl. No.: 15/451,609

(22) Filed: Mar. 7, 2017

(65) Prior Publication Data

US 2018/0067597 A1 Mar. 8, 2018

(30) Foreign Application Priority Data

Sep. 6, 2016 (KR) .................. 10-2016-0114617

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 3/0416* (2013.01); *G06F 3/0418* (2013.01); *G06F 2203/04102* (2013.01); *G06F 2203/04105* (2013.01); *G06F 2203/04111* (2013.01); *G06F 2203/04112* (2013.01)

(58) Field of Classification Search
CPC . G06F 2203/04102; G06F 2203/04105; G06F 2203/04111; G06F 2203/04112; G06F 3/0412; G06F 3/0416; G06F 3/0418; G06F 3/044
See application file for complete search history.

(56) References Cited

U.S. PATENT DOCUMENTS

| | | | |
|---|---|---|---|
| 9,201,259 B2 | 12/2015 | Kim et al. | |
| 9,383,849 B2 | 7/2016 | Hur | |
| 9,392,718 B2 | 7/2016 | Cho et al. | |
| 9,459,748 B2 | 10/2016 | Hashimoto et al. | |
| 2007/0298231 A1* | 12/2007 | Ito | B32B 27/00 428/213 |
| 2011/0298729 A1 | 12/2011 | Kim et al. | |

(Continued)

FOREIGN PATENT DOCUMENTS

| | | |
|---|---|---|
| JP | 2012-181781 | 9/2012 |
| JP | 5827749 | 12/2015 |

(Continued)

OTHER PUBLICATIONS

Extended European Search Report dated Nov. 24, 2017 in European Patent Application No. 17179240.1.

(Continued)

*Primary Examiner* — Viet D Pham
(74) *Attorney, Agent, or Firm* — H.C. Park & Associates, PLC

(57) ABSTRACT

A display device, including: a substrate; an electrode unit provided on the substrate; an emission layer driven by the electrode unit; a capacitive touch sensor provided on the electrode unit; and a conductive layer provided on the touch sensor.

18 Claims, 14 Drawing Sheets

(56) References Cited

U.S. PATENT DOCUMENTS

| | | | |
|---|---|---|---|
| 2012/0113063 A1 | 5/2012 | Kim et al. | |
| 2012/0162099 A1 | 6/2012 | Yoo et al. | |
| 2012/0235953 A1* | 9/2012 | Kim | G06F 3/044 345/174 |
| 2012/0306791 A1* | 12/2012 | Lee | G06F 3/041 345/173 |
| 2012/0313873 A1* | 12/2012 | Bright | G06F 3/044 345/173 |
| 2013/0194198 A1 | 8/2013 | Guard et al. | |
| 2014/0076612 A1* | 3/2014 | Kuriki | G06F 3/041 174/250 |
| 2014/0139481 A1 | 5/2014 | Han et al. | |
| 2014/0152619 A1* | 6/2014 | Hotelling | G09G 3/3648 345/174 |
| 2014/0210767 A1* | 7/2014 | Hur | G06F 3/0412 345/174 |
| 2015/0070298 A1* | 3/2015 | Shih | G06F 3/044 345/174 |
| 2015/0084907 A1* | 3/2015 | Burberry | G06F 3/046 345/174 |
| 2015/0124179 A1 | 5/2015 | Ko et al. | |
| 2015/0130760 A1* | 5/2015 | Kim | G06F 3/044 345/174 |
| 2015/0153779 A1* | 6/2015 | Ko | G06F 1/1652 345/173 |
| 2015/0370375 A1 | 12/2015 | Hayashi et al. | |
| 2016/0170524 A1 | 6/2016 | Kim et al. | |
| 2016/0221315 A1* | 8/2016 | Saiki | B32B 27/36 |
| 2016/0378224 A1* | 12/2016 | Kwon | H01L 51/5256 345/174 |
| 2017/0147116 A1* | 5/2017 | Lee | H01L 27/323 |
| 2017/0315657 A1* | 11/2017 | Lai | G06F 3/0412 |

FOREIGN PATENT DOCUMENTS

| | | |
|---|---|---|
| KR | 10-1335425 | 12/2013 |
| KR | 10-2014-0077604 | 6/2014 |
| KR | 10-2014-0096507 | 8/2014 |
| KR | 10-2015-0051490 | 5/2015 |
| KR | 10-2016-0002565 | 1/2016 |
| KR | 10-2016-0146226 | 12/2016 |
| KR | 10-2017-0026026 | 3/2017 |

OTHER PUBLICATIONS

Non-Final Office Action dated Mar. 29, 2019 issued in U.S. Appl. No. 15/893,689.

* cited by examiner

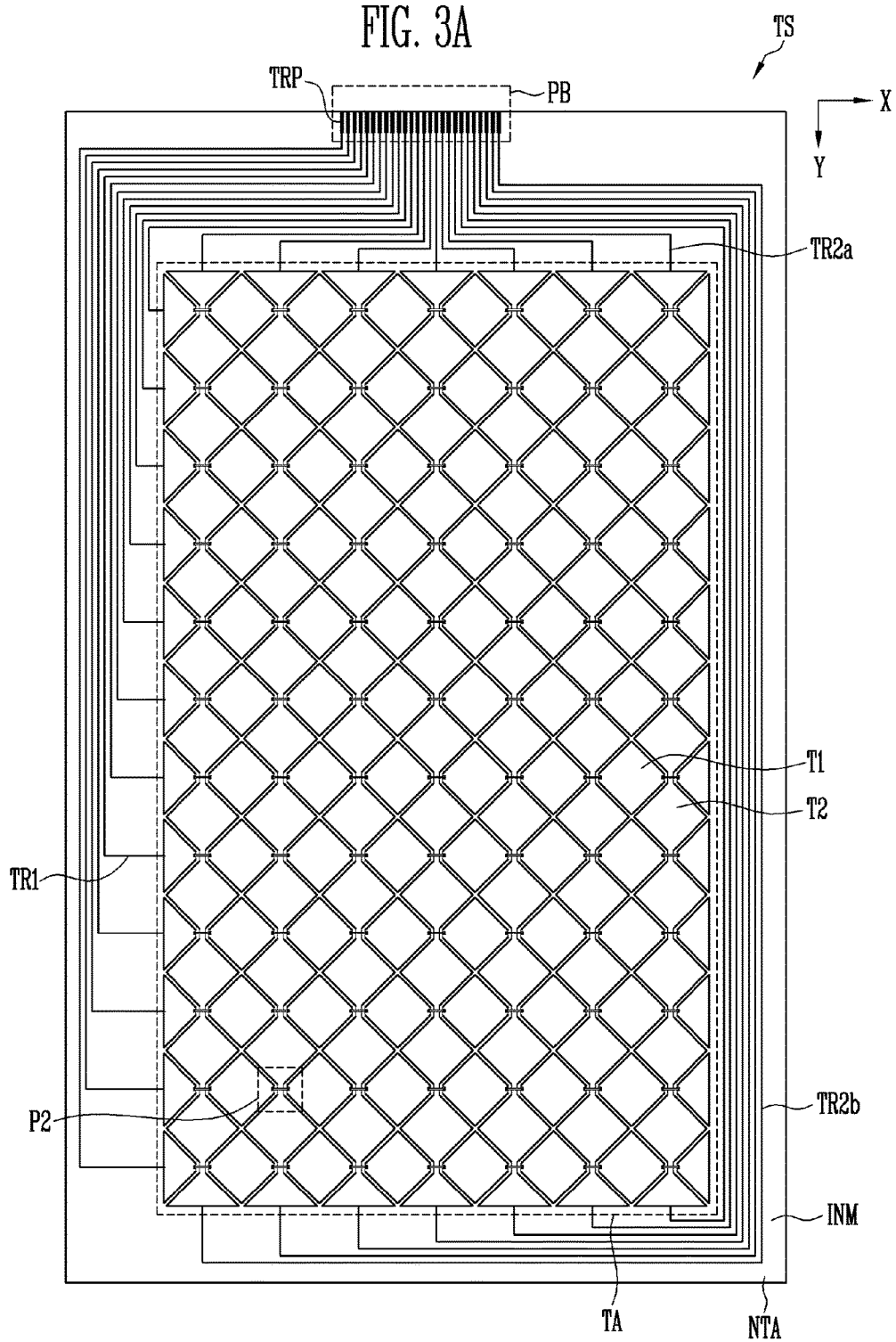

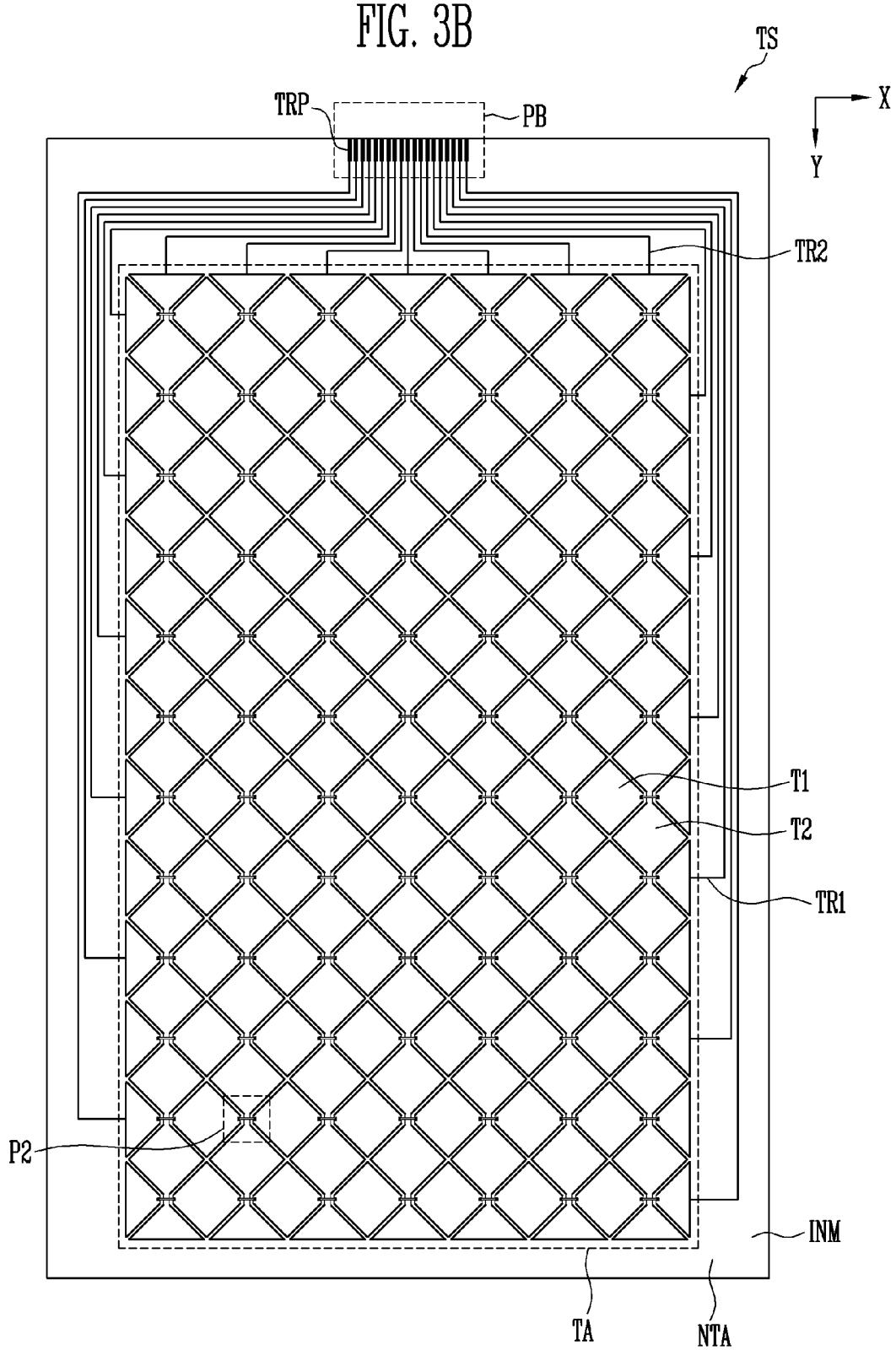

DISPLAY DEVICE

CROSS-REFERENCE TO RELATED APPLICATION

This application claims priority from and the benefit of Korean Patent Application No. 10-2016-0114617, filed on Sep. 6, 2016, which is hereby incorporated by reference for all purposes as if fully set forth herein.

BACKGROUND

Field

Exemplary embodiments relate to a display device. More particularly, exemplary embodiments relate to a display device including a touch sensor.

Discussion of the Background

According to an increase in interest regarding an information display, and an increase in demands for use of portable information media, research on, and commercialization of, display devices are steadily increasing.

A recent display device includes a touch sensor for receiving a touch of a user together with an image display function. Accordingly, a user is capable of more conveniently using the display device through the touch sensor.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display device having improved touch sensitivity.

An exemplary embodiment discloses a display device, including: a substrate; a first electrode disposed on the substrate; an emission layer on the first electrode; a second electrode on the emission layer; a capacitive touch sensor provided on the second electrode; and a conductive layer disposed on the touch sensor, wherein the touch sensor includes a plurality of touch electrodes having a mesh form.

The display device may further include a sensor control unit to receive corresponding values of a capacitance between the touch electrodes and a variation of the capacitance between the touch electrodes, wherein the variation of the capacitance between the touch electrodes is changed by a capacitance between the touch electrodes and the conductive layer and by a capacitance between the touch electrodes and the second electrode when a touch is made by a user.

The touch electrodes may include a first touch electrode, and a second touch electrode, which is spaced apart from the first touch electrode and forms capacitance with the first touch electrode.

One of the first and second touch electrodes may be a driving electrode, and the remaining one of the first and second touch electrodes may be a receiving electrode.

The conductive layer may have surface resistance of $10^5$ Ω/sq to $10^9$ Ω/sq. The conductive layer may have a thickness of 100 Å to 2,000 Å.

The conductive layer may include conductive polymer, and the conductive polymer may include at least one of polythiophene, polypyrrole, polyaniline, polyacetylene, polyphenylenether, and a mixture thereof. The conductive polymer may be PEDOT:PSS.

The display device may further include a window provided between the touch sensor and the conductive layer. The window may be formed of glass or a polymer resin.

The display device may further include an anti-reflecting layer provided between the touch sensor and the conductive layer.

The display device may further include an insulating layer provided between the touch sensor and the window. The insulating member may include a first insulating member and a second insulating member, which are sequentially laminated on the touch sensor.

The display device may further include a window provided on the conductive layer. The display device may further include an insulating member provided between the conductive layer and the window.

The display device may be flexible.

An exemplary embodiment also discloses a display device, including: a display part, which includes a display unit displaying an image, and one or more electrodes controlling a display of an image of the display unit; a capacitive touch sensor provided on the display part, the capacitive touch sensor including a plurality of touch electrodes having a mesh form; and a conductive layer provided on the touch sensor.

An exemplary embodiment also discloses a display device, including: a display part, which includes a display unit displaying an image, and one or more electrodes controlling a display of an image of the display unit; a capacitive touch sensor provided on the display part and configured to detect a touch of a user; a conductive layer provided on the touch sensor; and a sensor control unit configured to receive corresponding values of a capacitance of the touch sensor and a variation of the capacitance of the touch sensor, wherein the variation of the capacitance is changed by a capacitance between the touch sensor and the conductive layer and by a capacitance between the touch sensor and one of the electrodes of the display part when a touch is made by a user.

According to an exemplary embodiment of the present disclosure, it is possible to provide the display device with improved touch sensitivity.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 3A and FIG. 3B are top plan views illustrating touch sensors according to exemplary embodiments of the present disclosure.

DETAILED DESCRIPTION OF THE ILLUSTRATED EMBODIMENTS

Figure 1A:
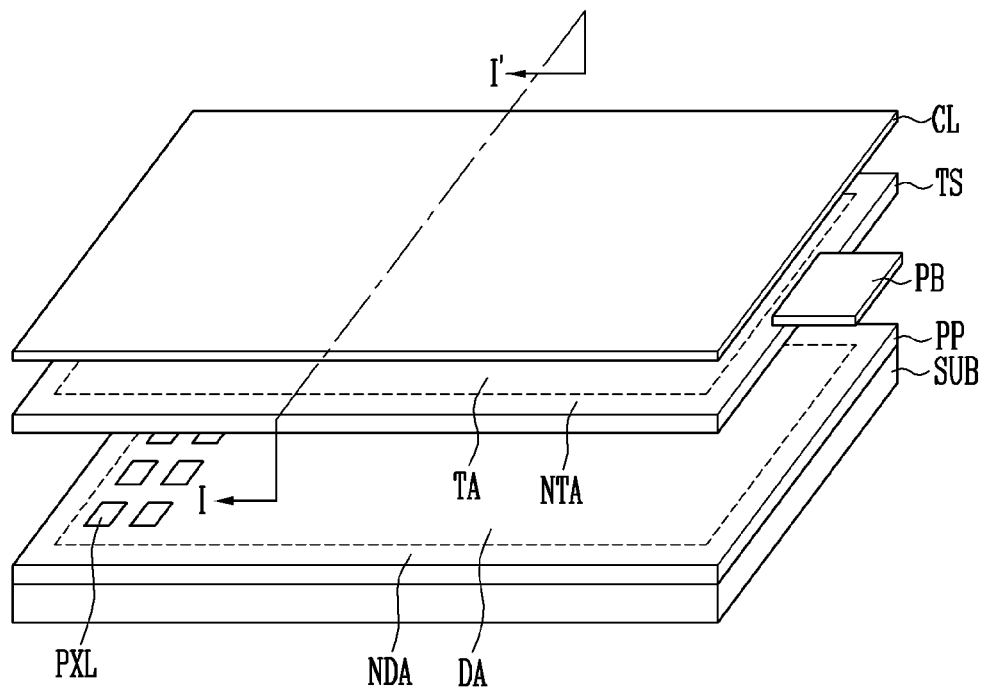
FIG. 1A is a perspective view of a display device according to an exemplary embodiment of the present disclosure.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, an exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1B:
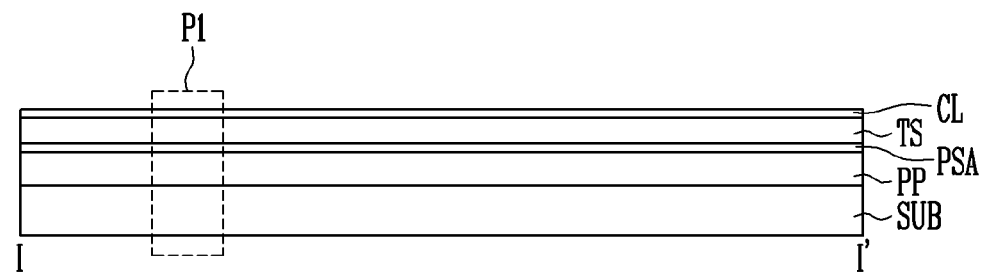
FIG. 1B is a cross-sectional view taken along line I-I' of FIG. 1A.

FIG. 1A is a perspective view of a display device according to an exemplary embodiment of the present disclosure, and FIG. 1B is a cross-sectional view taken along line I-I' of FIG. 1A.

Referring to FIGS. 1A and 1B, the display device according to an exemplary embodiment of the present disclosure includes a substrate SUB, a display part PP provided on the substrate SUB and displaying an image, a touch sensor TS provided on the display part PP, and a conductive layer CL provided on the touch sensor TS.

The substrate SUB may be formed of an insulating material, such as quartz, synthetic quartz, calcium fluoride, F-doped quartz, sodalime glass, non-alkali glass, and resin. Further, the substrate SUB may be formed of a flexible material so as to be bendable or foldable, and may have a single-layer structure or a multi-layer structure.

For example, the substrate SUB may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, the material of the substrate SUB may vary, and may be formed of Fiber Glass Reinforced Plastic (FRP), and the like.

In an exemplary embodiment of the present disclosure, the substrate SUB may be a polyimide substrate. The polyimide substrate may be formed of a first polyimide layer, a barrier film layer, and a second polyimide layer. When the polyimide substrate is thin and flexible, the polyimide substrate may be formed on a hard carrier substrate so as to support the forming of an emission structure. That is, in an exemplary embodiment, the substrate SUB may have a configuration in which a first polyimide layer, a barrier film layer, and a second polyimide layer are laminated on a carrier substrate. For example, after an insulating layer is disposed on the second polyimide layer, a thin film transistor, an emission device, and the like may be formed on the insulating layer. After the emission structure is formed, the carrier substrate may be removed. Since the polyimide substrate is thin and flexible, it may be difficult to directly form the emission structure on the polyimide substrate. Considering this case, the polyimide substrate may be used as the substrate SUB by forming the emission structure by using the hard carrier substrate and then removing the carrier substrate.

The substrate SUB is provided in a plate shape having a front surface and a rear surface opposite to the front surface. The display part PP may be provided on the front surface of the substrate SUB.

The display part PP displays predetermined visual information, for example, text, a video, a picture, and a 2D or 3D image through the front surface. As long as a display part displays an image, the kind of display part PP is not particularly limited.

An exemplary embodiment of the present disclosure is described based on an example in which the display part PP is an organic light emitting device. However, the kind of display part PP is not limited thereto, and another display part may be used within the scope of the present disclosure.

The display part PP may be provided in various shapes, and for example, a rectangular plate shape having two pairs of parallel sides. When the display part PP is provided in such a rectangular plate shape, a side of any one pair between the two pairs of sides may be longer than a side of another pair. In an exemplary embodiment of the present disclosure, for convenience of the description, a case where the display part PP has a rectangular shape having a pair of long sides and a pair of short sides is represented.

However, the shape of the display part PP is not limited thereto, and the display part PP may have various shapes. For example, the display part PP may be provided in various shapes, such as a polygon having a closed shape including a straight side, a circle and an ellipse including a curved side, and a semicircle and a half ellipse including a side formed of a straight line and a curve line. In an exemplary embodiment of the present disclosure, when the display part PP has a straight side, at least a part of the corners having a conic shape may have a curve line. For example, when the display part PP has the rectangular shape, a portion, in which the adjacent straight sides meet, may be replaced with a curve line having a predetermined curvature. That is, in a vertex portion of the rectangular shape, both adjacent ends of the vertex portion may be connected to two adjacent straight sides and be formed of curve sides having a predetermined curvature. The curvature may be differently set according to a position. For example, the curvature may be changed according to a start position of the curve line, a length of the curve line, and the like.

The entirety or at least a part of the display part PP may be flexible. For example, the display part PP may be flexible in an entire area, or may have flexibility in an area corresponding to a flexible area.

The display part PP may display an image on the front surface, and includes a display area DA, in which an image is displayed, and a non-display area NDA positioned at least one side of the display area DA. For example, the non-display area NDA may be provided in a form surrounding the display area DA.

The display area DA may be provided in a shape corresponding to a shape of the display part PP. For example, the DA may be provided in various shapes, such as a polygon having a closed shape including a straight side, a circle and an ellipse including a curved side, and a semicircle and a half ellipse including a side formed of a straight line and a curved line, similar to the shape of the display part PP. In an exemplary embodiment of the present disclosure, the display area DA may be provided in a rectangular shape.

The display part PP includes a display part displaying an image, and one or more electrodes controlling whether to display an image on the display part. The display part PP will be described below.

A touch sensor TS may be provided on the display part PP.

A pressure sensitive adhesive PSA may be provided between the touch sensor TS and the display part PP. The pressure sensitive adhesive PSA bonds two adjacent constituent elements, and in the present exemplary embodiment, the pressure sensitive adhesive PSA bonds the touch sensor TS and the display part PP. In an exemplary embodiment of the present disclosure, the pressure sensitive adhesive PSA may serve to bond two adjacent constituent elements into one, and disperse stress applied to the two constituent elements. To this end, the pressure sensitive adhesive PSA may be selected from pressure sensitive adhesives having a predetermined range of adhesiveness and elasticity. Various adhesives may be used as the pressure sensitive adhesive PSA mentioned in the present specification within a limit satisfying the aforementioned function, and the pressure sensitive adhesive PSA may be provided with various thicknesses.

The pressure sensitive adhesive PSA may be an optically transparent adhesive, through which an image passes from the display part PP to as great a degree as possible.

However, the touch sensor TS may be laid on the display part PP without the pressure sensitive adhesive PSA, or may be directly formed on the display part PP. In this case, the pressure sensitive adhesive PSA may not be provided between the touch sensor TS and the display part PP.

The touch sensor TS detects a position of a touch when a user generates the touch, and the touch sensor TS may be a capacitive type.

The touch sensor TS may include a touch area TA, which is capable of detecting a touch of a user, and a non-touch area NTA provided at least one side of the touch area TA. The touch area TA may correspond to the display area A, and the non-touch area NTA may correspond to the non-display area NDA. Accordingly, when viewed on a plane, the touch area TA and the display area DA may overlap each other, and the non-touch area NTA and the non-display area NDA may also correspond to each other. However, the sizes or the shapes of the touch area TA and the non-touch area NTA are not limited thereto. For example, the touch area TA may extend to a part of the non-display area NDA.

In an exemplary embodiment of the present disclosure, the touch sensor TS may include one or more touch electrodes provided within the touch area TA.

In an exemplary embodiment of the present disclosure, the touch sensor TS may include a printed circuit board PB, which is provided in the non-touch area NTA and is electrically connected to one or more touch electrodes. The touch sensor TS will be described below.

The conductive layer CL may be provided on the touch sensor TS, and when the conductive layer CL is touched by a user, the conductive layer CL changes capacitance between the electrode of the touch sensor TS and the touch sensor TS, and the touch sensor TS and the user, thereby improving sensitivity of the touch sensor TS.

The conductive layer CL may be provided in an outermost peripheral portion, that is, a touch surface, in which a touch of the user is generated, of the display device. However, as long as the conductive layer CL is present between the touch sensor TS and the finger of the user or a tool, the position of the conductive layer CL is not limited. For example, the conductive layer CL may also be provided between the touch sensor TS, which is to be described below, and a window, which is to be described below.

The conductive layer CL may be provided in an integral form, that is, a plate, which covers the entirety or most of the touch area TA of the touch sensor TS and is not separated. The conductive layer CL may extend to an area corresponding to the non-touch area NTA.

In an exemplary embodiment of the present disclosure, the conductive layer CL may include a conductive material. For example, a conductive polymer may be used as the conductive material.

In an exemplary embodiment of the present disclosure, the conductive polymer may include polythiophene, polypyrrole, polyaniline, polyacetylene, polyphenylenether, and a mixture thereof, and a poly(3,4-ethylenedioxythiophene) polystyrene sulfonate (PEDOT:PSS) among the polythiophenes may be used as the conductive polymer. The conductive polymer may be easily prepared by wet coating. Optionally, the conductive polymer may also be prepared by a roll-to-roll scheme. Since the conductive polymer has high flexibility, the possibility of a fracture may be decreased when the display device is bent.

The PEDOT:PSS may have relatively low resistance and relatively high optical transmittance. Further, the PEDOT:PSS may have refractivity similar to that of the substrate, the insulating member INM, the pressure sensitive adhesive PSA, so that optical loss may be relatively little.

In an exemplary embodiment of the present disclosure, the conductive layer CL may have surface resistance of $10^5$ $\Omega$/sq to $10^9$ $\Omega$/sq. In an exemplary embodiment of the present disclosure, the conductive layer CL may have a thickness of 100 Å to 2,000 Å.

In an exemplary embodiment of the present disclosure, the conductive layer CL may have transparency of 80% or more, and in another exemplary embodiment, the conductive layer CL may have transparency of 90% or more.

However, the material of the conductive layer CL is not limited thereto, and as long as a material satisfies the aforementioned property, other conductive materials may also be used. As the material of the conductive layer CL other than the conductive polymer, a metal, an alloy thereof, a conductive metal oxide, and the like may be used. In an exemplary embodiment of the present disclosure, the metal may include cooper, silver, gold, platinum, palladium, nickel, tin, aluminum, cobalt, rhodium, iridium, iron, ruthenium, osmium, manganese, molybdenum, tungsten, niobium, tantalum, titanium, bismuth, antimony, lead, and the like. The conductive metal oxide may include an Indium Tin Oxide (ITO), an Indium Zinc Oxide (IZO), an Antimony Zinc Oxide (AZO), an Indium Tin Zinc Oxide (ITZO), a Zinc Oxide (ZnC), a Tin Oxide ($SnO_2$), and the like.

Hereinafter, the display device according to an exemplary embodiment of the present disclosure will be described based on the display part PP with reference to FIG. 2.

Figure 2:
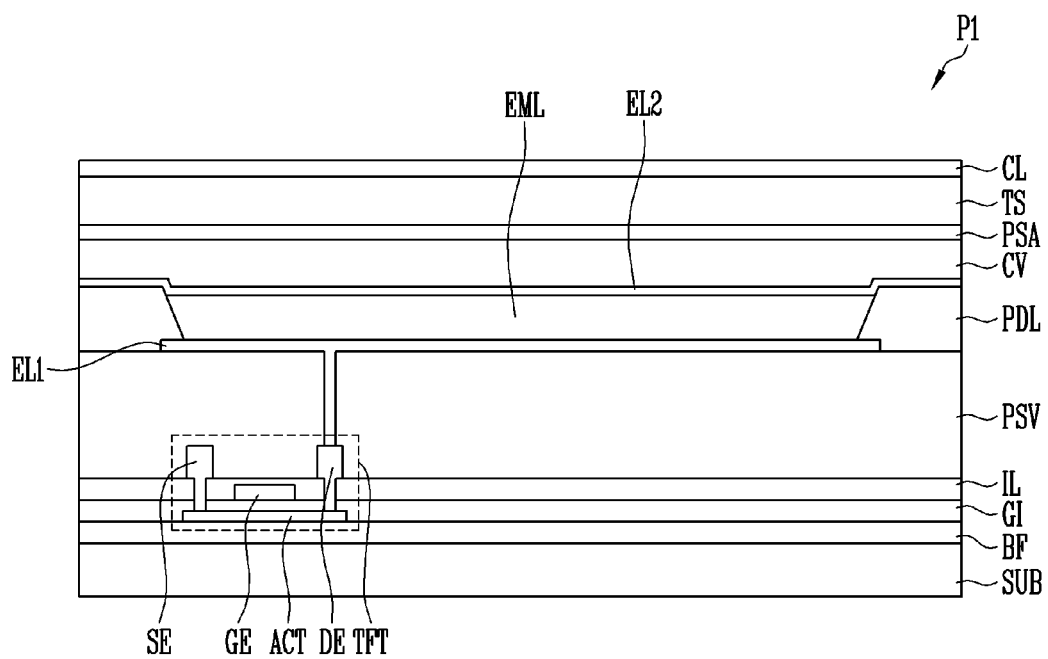
FIG. 2 is a cross-sectional view of an enlarged portion PI of FIG. 1A.

FIG. 2 is a cross-sectional view of an enlarged portion PI of FIG. 1A. Referring to FIG. 2 together with FIGS. 1A and 1B, in the display device according to an exemplary embodiment of the present disclosure, the display part PP includes a plurality of pixels PXL provided in the display area DA. The pixels PXL may be arranged in a matrix shape having rows and columns. However, the arrangement scheme of the pixels PXL may differ in various other ways.

In an exemplary embodiment of the present disclosure, the pixel PXL may be any one of a blue pixel emitting blue light, a green pixel emitting green light, and a red pixel emitting red light. However, the color of light emitted by each pixel PXL is not limited thereto, and light of a different color, for example, magenta light, yellow light, cyan light, white light, and the like may also be emitted.

The pixel PXL according to an exemplary embodiment of the present disclosure may include an insulating layer, a pixel defining layer PDL, a thin film transistor TFT, an emission device, and a cover layer CV provided on the substrate SUB. The thin film transistor TFT may include an active pattern ACT, a gate electrode GE, a source electrode SE, and a drain electrode DE. The insulating layer may include a buffer layer BF, a gate insulating layer GI, an interlayer insulating layer IL, and a passivation layer PSV. The emission device may include a first electrode EL1, a second electrode EL2, and an emission layer EML provided between the first electrode EL1 and the second electrode EL2.

The buffer layer BF is provided on the substrate SUB.

The buffer layer BF may prevent a phenomenon, in which metal atoms or impurities are dispersed (for example, outgassing) from the substrate SUB, and may adjust a heat transmission speed during a crystallization process for forming the active pattern ACT and substantially obtain the uniform active pattern ACT. Further, when a surface of the substrate SUB is not uniform, the buffer layer BF may serve to improve flatness of the surface of the substrate SUB. Two or more buffer layers BF may be provided on the substrate SUB, or the buffer layer BF may not be disposed according to the type of substrate SUB.

The active pattern ACT is provided on the buffer layer BF. The active pattern ACT may include an oxide semiconductor, an inorganic semiconductor (for example, amorphous silicon and poly silicon), or an organic semiconductor.

A gate insulating layer GI may be disposed on the active pattern ACT. The gate insulating layer GI covers the active pattern ACT. The gate insulating layer GI may be generally disposed on the substrate SUB. The gate insulating layer GI may be formed of various insulating materials, such as a silicon oxide, a silicon nitride, and a metal oxide.

The gate electrode GE may be disposed on a portion, in which the active pattern ACT is positioned, in a lower portion of the gate insulating layer GI. The gate electrode GE may be formed of metal, an alloy, a metal nitride, a conductive metal oxide, a transparent conductive material, and the like.

An interlayer insulating layer IL may be disposed on the gate electrode GE. The interlayer insulating layer IL may cover the gate electrode GE in an emission area EA, and may extend in a predetermined direction on the substrate SUB. The interlayer insulating layer IL may be generally disposed on the substrate SUB. The interlayer insulating layer IL may include a silicon compound, a metal oxide, and the like.

The source electrode SE and the drain electrode DE may be disposed on the interlayer insulating layer IL. The source electrode SE and the drain electrode DE may pass through parts of the gate insulating layer GI and the interlayer insulating layer IL, and be connected to one side and the other side of the active pattern ACT. Each of the source electrode SE and the drain electrode DE may include a metal, an alloy, a metal nitride, a conductive metal oxide, a transparent conductive material, and the like.

A passivation layer PSV may be disposed on the source electrode SE and the drain electrode DE. The passivation layer PSV may cover the source electrode SE and the drain electrode DE in the emission area EA, and may extend in a predetermined direction on the substrate SUB. That is, the passivation layer PSV may be generally disposed on the substrate SUB. The passivation layer PSB may include a silicon compound, a metal oxide, and the like.

The first electrode EL1 may be disposed on the passivation layer PSV. The first electrode EL1 may pass through parts of the passivation layer PSV and be connected to the drain electrode DE. The first electrode EL1 may be an anode having a high work function, and may include metal, an alloy, a metal nitride, a conductive metal oxide, and a transparent conductive material.

A pixel defining layer PDL may be disposed on the passivation layer PSV while exposing parts of the first electrode EL1. The pixel defining layer PDL may be formed of an organic material or an inorganic material. In this case, the emission layer EML may be provided on the first electrode EL1, of which at least a part is exposed by the pixel defining layer PDL.

In an exemplary embodiment of the present disclosure, a case where only the emission layer EML is formed on the first electrode EL1 is disclosed, but the inventive concepts are not limited thereto, and an organic layer, for example, a hole injection layer, a hole transporting layer, an electron transporting layer, and an electron injection layer, serving another function may be further formed. Further, the hole injection layer, the hole transporting layer, the electron transporting layer, and the electron injection layer may all be formed as in an exemplary embodiment, but one or two layers among them may be omitted. The emission layer may emit light of various colors according to the kind of sub pixel PXL. The emission layer may emit light of any one of, for example, red, blue, and green, but is not limited thereto, and may emit light of a different color.

The second electrode EL2 may be disposed on the pixel defining layer PDL and the emission layer EML. The second electrode EL2 may cover the pixel defining layer PDL and the emission layer EML, and may extend in a predetermined direction on the substrate SUB. The second electrode EL2 may be a cathode, and may be formed of a material having a low work function. The second electrode EL2 may be formed of metal, an alloy, a metal nitride, a conductive metal oxide, a transparent conductive material, and the like. The materials may be solely used or combined and used.

The cover layer CV is provided on the second electrode EL2.

The cover layer CV may be formed in a single layer, but may be formed in multiple layers. In an exemplary embodiment of the present disclosure, the cover layer CV may be formed of triple layers. The cover layer CV may be formed of an organic material and/or an inorganic material. The cover layer CV positioned at an outermost portion may be formed of an inorganic material. In an exemplary embodiment of the present disclosure, the cover layer CV may be formed of an inorganic material/organic material/inorganic material, but is not limited thereto. An organic insulating material, such as a polyacryl-based compound, a polyimide-based compound, a fluorocarbon including Teflon®, and a benzocyclobutene may be used as the organic material, and polysiloxane, a silicon nitride, a silicon oxide, a silicon oxynitride may be used as an inorganic material.

The touch sensor TS may be provided on the cover layer CV with the pressure sensitive adhesive PSA interposed therebetween, and the conductive layer CL may be provided on the touch sensor TS.

In the emission device having the aforementioned structure, a voltage is applied to each of the first electrode EL1 and the second electrode EL2, so that holes injected from the first electrode EL1 move to the emission layer EML, and electrons injected from the second electrode EL2 move to the emission layer EML. The electrons and the holes are recombined in the emission layer EML and generate excitons, and the excitons emit light while being changed from an exciton state to a ground state.

Hereinafter, the display device according to an exemplary embodiment of the present disclosure will be described based on the touch sensor TS with reference to FIG. 3.

FIGS. 3A and 3B are top plan views illustrating the touch sensors TS according to exemplary embodiments of the present disclosure. The touch sensor TS according to an exemplary embodiment of the present disclosure is a capacitive type, and may be provided as a mutual capacitive type and/or a self-capacitive type. In an exemplary embodiment presented below, the present invention will be described based on the touch sensor in the mutual capacitive type as an example, but inventive concepts are not limited thereto.

First, referring to FIG. 3A, the touch sensor TS according to an exemplary embodiment of the present disclosure includes an insulating member INM, and first touch electrodes T1 and second touch electrodes T2 formed on the insulating member INM. In the touch sensor TS, first wires TR1 electrically connected with the first touch electrodes T1 may be provided, and further, second wires TR2 electrically connected with the second touch electrodes T2 may be provided. At least one of the first wires TR1 and the second wires TR2 may be connected to both ends of a series of connected touch electrodes. In the present exemplary embodiment, the second wires TR2 may include first sub wires TR2a connected to one end of a series of connected second touch electrodes T2, and second sub wires TR2b connected to the other end of a series of connected second touch electrodes T2.

Pads TRP may be connected to ends of the first wires TR1 and the first and second sub wires TR2a and TR2b. An exemplary embodiment of the present disclosure illustrates that the pads TRP are connected to the ends of the first sub wires TR2a and the second sub wires TR2b, respectively, but the inventive concepts are not limited thereto. The first sub wires TR2a and the second sub wires TR2b may be connected with each other within a sensor control unit or within the non-touch area NTA. Accordingly, the sensor control unit may receive signals from both ends of the first sub wires TR2a and the second sub wires TR2b.

Referring to FIG. 3B, the touch sensor TS according to an exemplary embodiment of the present disclosure includes an insulating member INM, and first touch electrodes T1 and second touch electrodes T2 formed on the insulating member INM. In the touch sensor TS, first wires TR1 electrically connected with the first touch electrodes T1 may be provided, and further, second wires TR2 electrically connected with the second touch electrodes T2 may be provided. The first wires TR1 may be connected to one end of a series of connected first touch electrodes T1, and the second wires TR2 may also be connected to one end of a series of connected second touch electrodes T2.

In an exemplary embodiment of the present disclosure, a sensor control unit (not illustrated) may be provided in the touch sensor TS. Any one of the first touch electrode T1 and the second touch electrode T2 may be a driving electrode receiving a driving signal from the sensor control unit. The other one of the first touch electrode T1 and the second touch electrode T2 may be a receiving electrode transmitting an external detection signal, such as a touch of a user, to the sensor control unit. For example, the first touch electrode T1 may be a driving electrode, and the second touch electrode T2 may be a receiving electrode. Otherwise, in contrast to this, the first touch electrode T1 may be a receiving electrode, and the second touch electrode T2 may be a driving electrode. The sensor control unit recognizes a detection signal received from the receiving electrode to recognize a touch.

The sensor control unit may be provided in a form of a printed circuit board PB, a tape carrier package, or a chip-on-film, and may be electrically connected to pads through separate wires, a connector, and the like. Herein, the printed circuit board PB or the tape carrier package may have flexibility.

In an exemplary embodiment of the present disclosure, the sensor control unit is provided to the printed circuit board PB and connected to the pads. The sensor control unit may be electrically connected to the pads through an anisotropic conductive film on the printed circuit board PB.

The insulating member INM may have or may not have flexibility. A material of the insulating member INM may be selected from the materials forming the substrate SUB.

Further, the insulating member INM may be provided in a layer or film form, and may be transparently or semi-transparently implemented so as to secure predetermined transparency or more, or may also be implemented to be opaque according to a disposition structure with respect to a display panel and the like.

Figure 4:
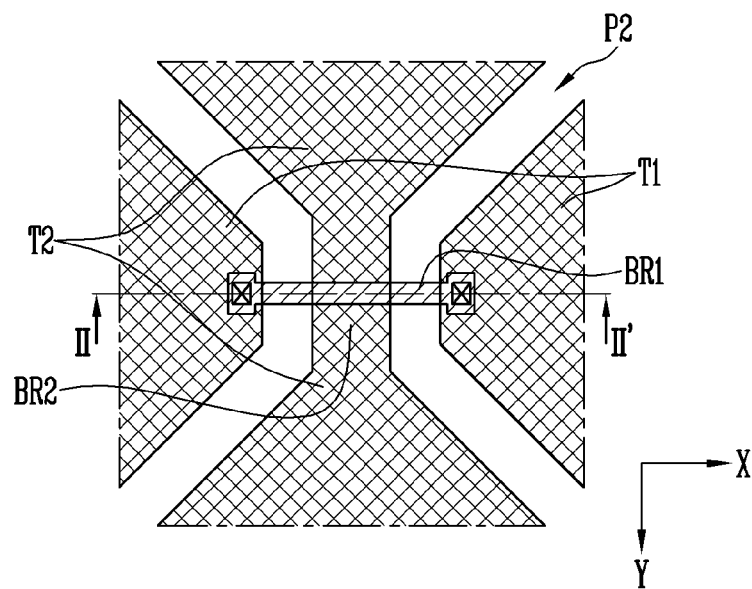
FIG. 4 is a top plan view illustrating a part of the touch sensors illustrated in FIGS. 3A and 3B.

The first touch electrodes T1 are formed on the insulating member INM, for example, in an X-axis direction. For example, each of the first touch electrodes T1 may be arranged in the same row in the X-axis direction. The first touch electrodes T1 arranged in each row may include a plurality of first bridges BR1 connecting the adjacent first touch electrodes T1 in the X-axis direction, as shown in FIG. 4.

The first touch electrodes T1 are connected to pads TRP through the first wires TR1, respectively.

The second touch electrodes T2 are formed on the insulating member INM, for example, in a Y-axis direction. For example, each of the second touch electrodes T2 may be arranged in the same column in the Y-axis direction. The second touch electrodes T2 arranged in each column may include a plurality of second bridges BR2 connecting the adjacent second touch electrodes T2 in the Y-axis direction.

The second touch electrodes T2 are connected to the pads TRP through the second wires TR2, respectively.

In an exemplary embodiment of the present disclosure, the first bridges BR1 may be integrally formed with the first touch electrodes T1 in the corresponding row. Otherwise, the second bridges BR2 may be integrally formed with the second touch electrodes T2 in the corresponding column. However, the inventive concepts are not limited thereto, and the first bridges BR1 and/or the second bridges BR2 may also be changed to have a structure including one or more bridges and be implemented.

In an exemplary embodiment of the present disclosure, FIGS. 3A and 3B illustrate that the first and second touch electrodes T1 and T2 are shaped like a diamond, but the shapes of the first and second touch electrodes T1 and T2 may be varied in other ways. For example, the first and second touch electrodes T1 and T2 may be implemented in a circular shape.

Although not illustrated in FIGS. 3A and 3B, an insulating layer for insulating the first touch electrodes 310 T1 the second touch electrodes T2 is interposed in at least one region between the first touch electrodes T1 and the second touch electrodes T2, particularly, at least a crossing portion of the first touch electrodes T1 and the second touch electrodes T2.

In an exemplary embodiment of the present disclosure, when the first touch electrodes T1 are the driving electrodes and the second touch electrodes T2 are the receiving electrodes, the first touch electrodes T1 may receive driving signals from the sensor control unit through the pads TRP, respectively, and the second touch electrodes T2 may output the detection signal by a touch of a user to the sensor control unit through the pads TRP, respectively. In this case, the touch sensors TS in an exemplary embodiments illustrated in FIGS. 3A and 3B may be driven in a mutual capacitive type.

In FIGS. 3A and 3B, the first and second touch electrodes T1 and T2 are disposed in the X-axis direction and the Y-axis direction, respectively, but the inventive concepts are not limited thereto. For example, the first touch electrodes T1 and/or the second touch electrodes T2 may also be disposed in a direction, for example, a diagonal direction, other than the X-axis direction and the Y-axis direction.

FIG. 4 is a top plan view illustrating a part P2 of the touch sensors TS illustrated in FIGS. 3A and 3B. In FIG. 4, the same reference numeral is assigned to the constituent element which is the same as or similar to the constituent element of FIGS. 3A and 3B, and a detailed description thereof will be omitted.

In an exemplary embodiment of the present disclosure, at least a part of the first touch electrodes T1 and the second touch electrodes T2 is provided in a mesh form formed of thin lines. For example, at least one of the first touch electrodes T1 and the second touch electrodes T2 may be formed to include one or more mesh-type conductive layers. For example, at least one of the first touch electrodes T1 and the second touch electrodes T2 may be provided in a form, in which thin lines extended in different directions cross one another when viewed on a plane, and the thin lines are connected to each other in crossing points. That is, when viewed on a plane, the first and second touch electrodes T1 and T2 are provided in a form, in which a plurality of openings is formed inside in the first and second touch electrodes T1 and T2.

Referring to FIG. 4, a first bridge BR1 is disposed between the two first touch electrodes T1 adjacent in the X-axis direction. For convenience of the description, the present exemplary embodiment discloses a case where the number of first bridges BR1 between the two adjacent first touch electrodes T1 is one, but the number of first bridges BR1 may be variously changed.

A second bridge BR2 is disposed between the two second touch electrodes T2 adjacent in the Y-axis direction. For convenience of the description, the present exemplary embodiment discloses a case where the number of second bridges BR2 between the two adjacent second touch electrodes T2 is one, but the number of second bridges BR2 may be variously changed. In the present exemplary embodiment, FIG. 4 illustrates that the second bridge BR2 is integrally formed with the second touch electrodes T2.

In an exemplary embodiment of the present disclosure, each of the first and/or second touch electrodes T1 and T2 includes a conductive material. As the conductive material, a metal, an alloy thereof, a conductive polymer, a conductive metal oxide, and the like may be used. In an exemplary embodiment of the present disclosure, the metal may include cooper (Cu), silver (Ag), gold (Au), platinum (Pt), palladium (Pd), nickel (Ni), tin (Sn), aluminum (Al), cobalt (Co), rhodium (Rh), iridium (Ir), iron (Fe), ruthenium (Ru), osmium (Os), manganese (Mn), molybdenum (Mo), tungsten (W), niobium (Nb), tantalum (Ta), titanium (Ti), bismuth (Bi), antimony (Sb), and lead (Pb). The conductive polymer may include polythiophene, polypyrrole, polyaniline, polyacetylene, polyphenylenether, and a mixture thereof, and particularly, a PEDOT:PSS among the polythiophenes may be used. The conductive metal oxide may include an Indium Tin Oxide (ITO), an Indium Zinc Oxide (IZO), an Antimony Zinc Oxide (AZO), an Indium Tin Zinc Oxide (ITZO), a Zinc Oxide (ZnC), a Tin Oxide ($SnO_2$), and the like. In an exemplary embodiment of the present disclosure, the first and second touch electrodes T1 and T2 may be formed of a single layer or multiple layers.

The first bridge BR1 may include the aforementioned material of the first and/or second touch electrodes T1 and T2. For example, the first bridge BR1 may be implemented by a metal bridge formed of a low-resistance metal, such as molybdenum (Mo), silver (Ag), titanium (Ti), copper (Cu), aluminum (Al), molybdenum/aluminum/molybdenum (Mo/Al/Mo).

According to an exemplary embodiment of the present disclosure, one of the first and second touch electrodes T1 and T2 may be a driving electrode, and the other may be a receiving electrode. When a user inputs a touch to the first and second touch electrodes T1 and T2 or an area around the first and second touch electrodes T1 and T2, capacitance between the driving electrode and the receiving electrode may be changed. The sensor control unit may detect whether the user inputs the touch and a touch position by detecting a variation of capacitance between the driving electrode and the receiving electrode.

Figure 5A:
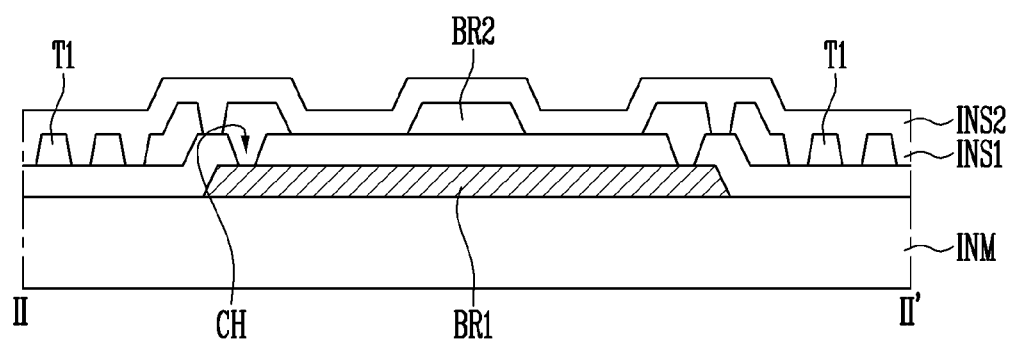
FIG. 5A and FIG. 5B are cross-sectional views illustrating touch sensors according to exemplary embodiments of the present disclosure, and are the views taken along line II-II' of FIG. 4.
Figure 5B:
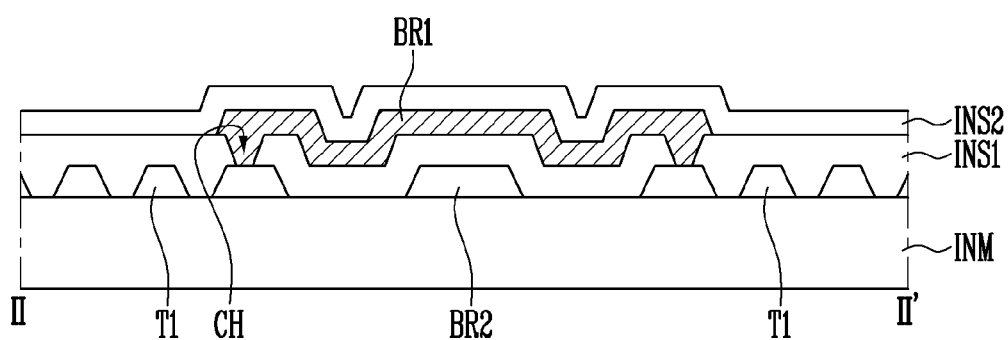

FIGS. 5A and 5B are cross-sectional views illustrating the touch sensors TS according to exemplary embodiments of the present disclosure, and are the views taken along line II-IT of FIG. 4. In FIGS. 5A and 5B, the same reference numeral is assigned to the constituent element which is the same as or similar to the constituent element of FIGS. 3 and 4, and a detailed description thereof will be omitted.

Referring to FIG. 5A, the first touch electrodes T1 and the second touch electrodes T2 are provided on the insulating member INM.

The insulating member INM may be used as a substrate for forming the first touch electrodes T1 and the second touch electrodes T2. For example, the insulating member INM may be provided in a form of a film. In an exemplary embodiment of the present disclosure, for convenience of the description, it is illustrated that the insulating member INM is used as a substrate for forming the first touch electrodes T1 and the second touch electrodes T2, but if there is another constituent element, on which the first touch electrodes T1 and the second touch electrodes T2 may be formed, the insulating member INM may be replaced with the constituent element. For example, the insulating member INM may be provided in a form of a film and be replaced with a part of the display part PP, and in this case, the first touch electrodes T1 and the second touch electrodes T2 may be directly formed on the display part PP. For example, the first touch electrodes T1 and the second touch electrodes T2 may be formed on the cover part CV formed at a topmost end of the display part PP, the cover part CV serving as the insulating member INM. Otherwise, in another exemplary embodiment of the present disclosure, unless contrary to the concept of the present disclosure, the insulating member INM may also be replaced with another constituent element, for example, a window WD to be described below.

In the present exemplary embodiment, it is illustrated that the first touch electrodes T1 and the second touch electrodes T2 are formed on the insulating member INM, and for convenience of the description, it is illustrated that the first touch electrodes T1 and the second touch electrodes T2 are formed at an upper side of the insulating member INM in the drawing. However, the positions of the insulating member INM and the first touch electrodes T1 and the second touch electrodes T2 are not limited thereto, and the insulating member INM and the first touch electrodes T1 and the second touch electrodes T2 may also be provided in an upside down form when disposed on the display part PP. That is, when the touch sensor TS is disposed on the display part PP, in an exemplary embodiment, an upper surface (that is, the cover part) of the display part PP may face the first and second touch electrodes T1 and T2, and in another exemplary embodiment, an upper surface of the display part PP may face the insulating member INM.

In an exemplary embodiment of the present disclosure, the first touch electrodes T1 and the second touch electrodes T2 are provided in a mesh form formed of thin lines. Accordingly, the two adjacent thin lines in the first touch electrodes T1 and the second touch electrodes T2 are spaced apart from each other. In the cross-sectional view of FIG. 5A, a case where a plurality of openings is provided within the first touch electrode T1 is disclosed as an example.

The touch sensor TS according to the present exemplary embodiment may be implemented in a lower bridge structure. More particularly, the touch sensor TS includes a first bridge BR1 formed on the insulating member INM, a first insulating layer INS1 on the first bridge BR1, the first touch electrodes T1 formed on the first insulating layer INS1, and a second insulating layer INS2 formed on the first touch electrodes T1 and the second bridge BR2.

The first touch electrodes T1 may be electrically connected to the adjacent first bridge BR1 through a contact hole CH passing through the first insulating layer INS1.

Although not illustrated in the cross-sectional view of FIG. 5A, the second touch electrodes T2 illustrated in FIG. 4 may be integrally formed with the second bridge BR2 on the first insulating layer INS1.

Further, FIG. 5A illustrates a structure, in which the first touch electrodes T1 and the second touch electrodes T2 are substantially disposed on the same layer, but the inventive concepts are not limited thereto. For example, according to an exemplary embodiment, the first touch electrodes T1 and the second touch electrodes T2 may also be disposed on different layers.

Additionally, the touch sensor TS according to the present exemplary embodiment is not limited to the lower bridge structure.

For example, as illustrated in FIG. 5B, the touch sensor TS according to the present exemplary embodiment may also be implemented in an upper bridge structure.

Referring to FIG. 5B, the first touch electrodes T1 and the second bridge BR1 may be formed on the insulating member INM, and the first bridge BR1 may be formed on the first insulating layer INS1. The second touch electrodes T2 (not illustrated) may be integrally formed with the second bridge BR2 on the insulating member INM.

FIGS. 5A and 5B illustrate an entire surface insulating layer structure, in which the first insulating layer INS1 is entirely formed, but the inventive concepts are not limited thereto. For example, a partial insulating layer shaped, such as a locally patterned island, may also be formed in every crossing portion of the first and second bridges BR1 and BR2.

In the display device according to an exemplary embodiment of the present disclosure having the aforementioned structure, touch sensitivity is improved throughout an entire surface of the touch area TA. In a case of the display device in the related art, touch sensitivity is considerably different according to a position of the touch area TA, and there is a problem in that a specific area (an area far from the sensor control unit) cannot recognize a touch. However, in the display device according to an exemplary embodiment of the present disclosure, touch sensitivity in the entire touch area TA is improved, so that touch sensitivity is remarkably improved. This will be described with reference to FIGS. 6A, 6B, 7, 8A, and 8B.

Figure 6A:
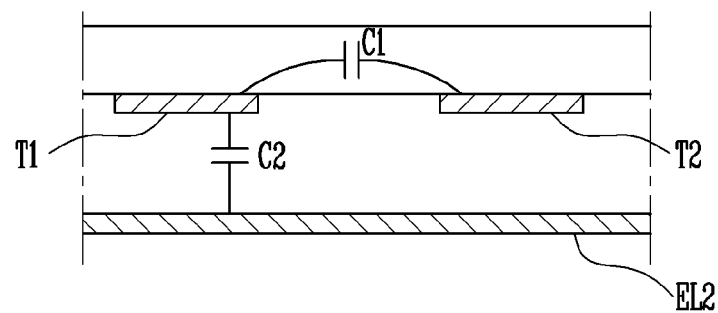
FIG. 6A and FIG. 6B are cross-sectional views conceptually illustrating a principle of detecting a touch in a display device according to the related art.
Figure 6B:
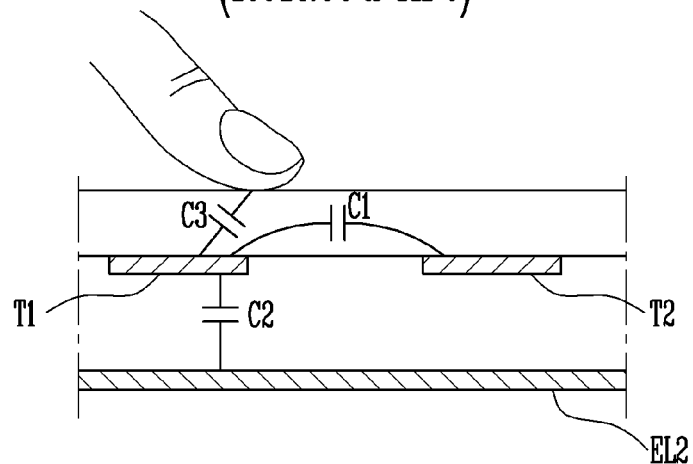

FIGS. 6A and 6B are cross-sectional views conceptually illustrating a principle of detecting a touch in a display device according to the related art.

FIGS. 6A and 6B illustrate only a second electrode EL2 in a display part PP, a first touch electrode T1 and a second touch electrode T2, which are adjacent to each other in the touch sensor TS, and an insulating member INM for convenience of the description, and the remaining constituent elements are omitted. In the present exemplary embodiment, an upper surface of the insulting member INM is set as a touch surface, in which a touch event of a user is made. The "touch of the user" includes a touch by another tool (for example, a stylus pen), as well as a finger of the user. During the touch of the user, a finger of the user or another tool may be grounded.

In FIGS. 6A and 6B, a capacitor formed between a first touch electrode T1 and a second touch electrode T2 is referred to as a first capacitor C1, and a capacitor formed between a second electrode EL2 and the first touch electrode T1 and/or the second touch electrode T2 is referred to as a second capacitor C2.

Referring to FIG. 6A, when there is no touch of the user, the first capacitor C1 having a first capacitance is formed between the first touch electrode T1 and the second touch electrode T2, and the second capacitor C2 having a second capacitance is formed between the second electrode EL2 and the first touch electrode T1 and/or the second touch electrode T2.

The second capacitance is a value between the second electrode EL2 and the first touch electrode T1 and/or the second touch electrode T2, and is varied according to a voltage and resistance applied to each portion of the second electrode EL2. However, according to a recent trend of making the display device more compact, a gap between the second electrode EL2 and the first touch electrode T1 and/or the second touch electrode T2 tends to be very narrow. Accordingly, an influence of the second electrode EL2 on the first touch electrode T1 and/or the second touch electrode T2 is varied according to a position of a voltage applying unit which applies a voltage to the second electrode EL2. When the voltage applying unit is provided at the same side as that of the sensor control unit, an influence of the second electrode EL2 on the first touch electrode T1 and/or the second touch electrode T2 is decreased the farther the second electrode EL2 is from the voltage applying unit. As a result, the first capacitance of the first capacitor formed between the first touch electrode T1 and the second touch electrode T2 has a large value since it is relatively far from the touch sensor unit (not illustrated). For example, the first capacitance of a portion relatively close to the touch sensor unit has a small value, and the second capacitance of a portion relatively far from the touch sensor unit has a large value.

Referring to FIG. 6B, when a touch of the user is made, in addition to the first capacitor C1 and the second capacitor C2, a third capacitor C3 having third capacitance is formed between the hand of the user and the first touch electrode T1 and/or the second touch electrode T2.

The first capacitance of the first capacitor C1 is changed according to the forming of the third capacitor C3 by the touch of the user.

When it is assumed that a variation of the first capacitance by the touch of the user is a first capacitance variation $\Delta C1$, the touch sensor unit receives a changed first capacitance value and draws a value of $\Delta C1/C1$ based on the received changed first capacitance value in order to recognize the touch of the user. However, since the first capacitance of the portion relatively close to the touch sensor unit has a small value, and the second capacitance of the portion relatively far from the touch sensor unit has a large value, the value of $\Delta C1/C1$ calculated by the touch sensor unit has a small value as the portion is far from the touch sensor unit. As a result, when the touch of the user is recognized through the variation of the first capacitance, touch sensitivity is degraded because the touch is far from the touch sensor unit.

Figure 7:
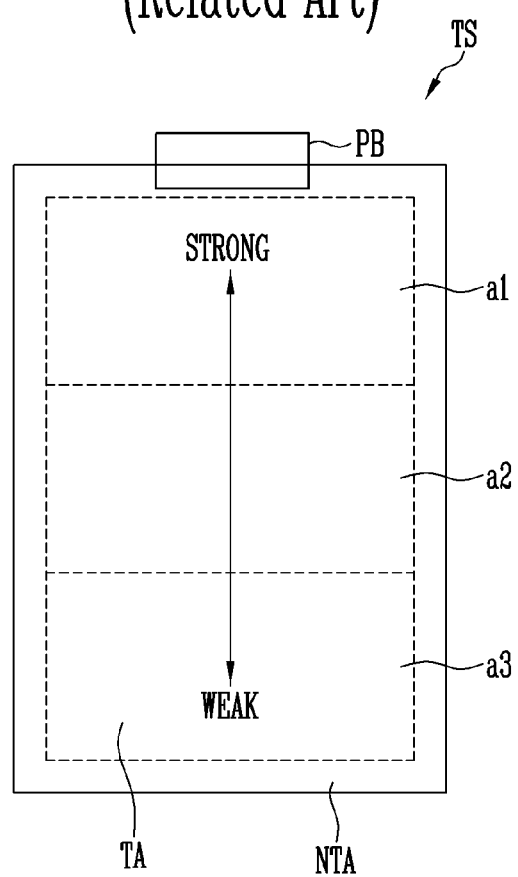
FIG. 7 is a diagram illustrating intensity of a detection signal, which a sensor control unit receives, in the display device according to the related art.

FIG. 7 is a diagram illustrating intensity of a detection signal, which the sensor control unit receives, in the display device according to the related art. Intensity of the detection signal is a value corresponding to $\Delta C1/C1$ and is a relative value after a predetermined calculation within the sensor control unit. Referring to FIG. 7, when it is assumed that the sensor control unit sequentially has first to third areas a1, a2, and a3 from a provided printed circuit board PB, intensities of the detection signals from the first area a1 to the third area a3 are gradually decreased. Accordingly, the third area a3, which is farthest from the sensor control unit, may not recognize the touch even though the touch of the user is made.

Figure 8A:
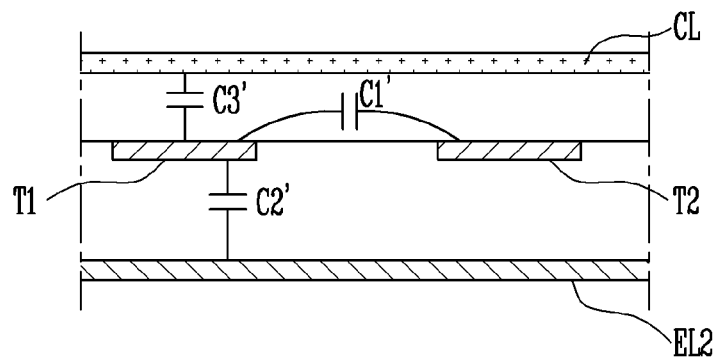
FIG. 8A and FIG. 8B are cross-sectional views conceptually illustrating a principle of detecting a touch in a display device according to an exemplary embodiment of the present disclosure.
Figure 8B:
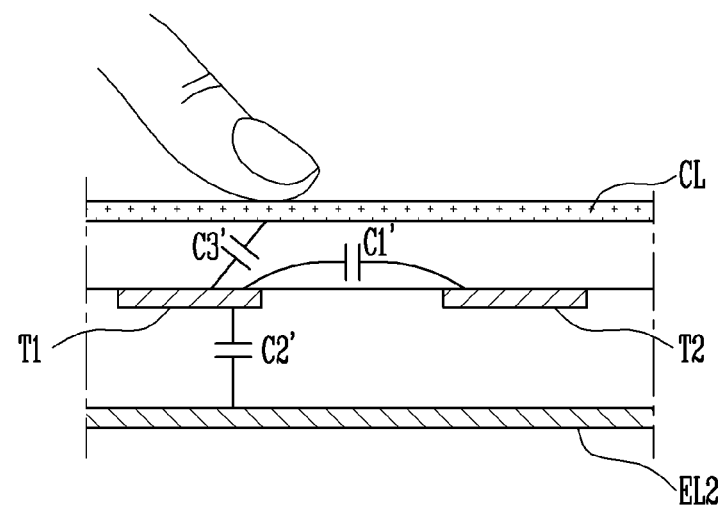

FIGS. 8A and 8B are cross-sectional views conceptually illustrating a principle of detecting a touch in a display device according to an exemplary embodiment of the present disclosure. FIGS. 8A and 8B illustrate a second electrode EL2 in a display part PP, a first touch electrode T1 and a second touch electrode T2, which are adjacent to each other in the touch sensor TS, an insulating member INM, and a conductive layer CL for convenience of the description, and the remaining constituent elements are omitted. In the present exemplary embodiment, an upper surface of the conductive layer CL is set as a touch surface, in which a touch event of a user is made. The "touch of the user" includes a touch by another tool (for example, a stylus pen), as well as a finger of the user.

In FIGS. 8A and 8B, a capacitor formed between a first touch electrode T1 and a second touch electrode T2 is referred to as a first capacitor C1'; a capacitor formed between a second electrode EL2 and the first touch electrode T1 and/or the second touch electrode T2 is referred to as a second capacitor C2'; and a capacitor formed between the conductive layer CL and the first touch electrode T1 and/or the second touch electrode T2 is referred to as a third capacitor C3'.

Referring to FIG. 8A, when there is no touch of the user, the first capacitor C1' having first capacitance is formed between the first touch electrode T1 and the second touch electrode T2, and the second capacitor C2' having second capacitance is formed between the second electrode EL2 and the first touch electrode T1 and/or the second touch electrode T2. The third capacitor C3' is formed between the conductive layer CL and the first touch electrode T1 and/or the second touch electrode T2, and the third capacitor C3' releases at least a part of charges held in the second capacitor C2' between the second electrode EL2 and the first touch electrode T1 and/or the second touch electrode T2. The charges may be stored between the first touch electrode T1 and/or the second touch electrode T2 and the conductive layer CL, and thus, the second capacitance is significantly decreased as compared to the display device in the related art.

Referring to FIG. 8B, when the touch of the user is made, the touch of the user is made on the conductive layer CL. The charges between the first touch electrode T1 and/or the second touch electrode T2 and the conductive layer CL may be discharged to the outside through the grounded finger of the user and the like. The second capacitance of the second capacitor C2 of the related art is a considerably smaller value than that of the second capacitance of the second capacitor CT of the inventive concepts, which means that an influence of the second electrode EL2 on the first capacitance of the first capacitor C1' is decreased. Accordingly, when the voltage applying unit is provided at the same side as that of the sensor control unit, the influence of the second electrode EL2 on the first touch electrode T1 and/or the second touch electrode T2 is similar, regardless of the position in the second electrode EL2. As a result, the first capacitance of the first capacitor formed between the first touch electrode T1 and the second touch electrode T2 does not exhibit a large difference even though the positon in the second electrode EL2 is far from the touch sensor unit (not illustrated). For example, the first capacitance of a portion relatively close to the touch sensor unit and the second capacitance of a portion relatively far from the touch sensor unit have similar values.

As a result, a value of detection signal $\Delta C1'/C1'$ detected by the sensor control unit is not influenced by the position, and is maintained with a relatively uniform level. Accordingly, the third area a3, which is farthest from the sensor control unit, may recognize the touch.

The mutual capacitive touch sensor TS according to an exemplary embodiment has been described, but the touch sensor TS may also be provided in a self-capacitive type within the scope of the inventive concepts of the present disclosure. In a case of the self-capacitive touch sensor, capacitors are formed between the second electrode and the touch electrodes of the touch sensor, and the capacitances of the touch electrodes are influenced by the second electrode. However, when the conductive layer is formed like an exemplary embodiment of the present disclosure, touch sensitivity may be improved by releasing at least a part of charges held in the capacitors between the second electrode and the touch electrodes.

In an exemplary embodiment of the present disclosure, each constituent element may be implemented in various forms within the scope of the inventive concepts of the present disclosure. FIGS. 9 to 17 are cross-sectional views of display devices according to exemplary embodiments of the present disclosure, and in the exemplary embodiments discussed below, portions that differ from those of the aforementioned exemplary embodiment will be mainly described in order to avoid overlapping of the description.

FIGS. 9 to 17 are cross-sectional views of display devices according to exemplary embodiments of the present disclosure.

Figure 9:
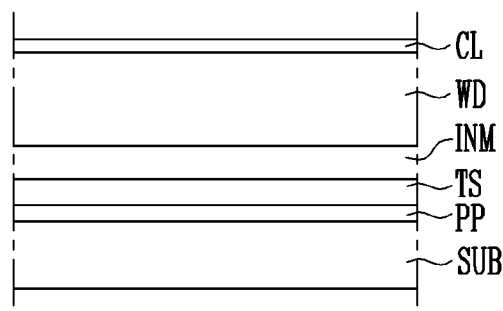
FIG. 9, FIG. 10, FIG. 11, FIG. 12, FIG. 13, FIG. 14, FIG. 15, FIG. 16, and FIG. 17 are cross-sectional views of display devices according to exemplary embodiments of the present disclosure.

Referring to FIG. 9, a display device according to an exemplary embodiment of the present disclosure may include a substrate SUB, a display part PP provided on the substrate SUB, a touch sensor TS provided on the display part PP, a window WD provided on the touch sensor TS, and a conductive layer CL provided on the window WD. An insulating layer INM may be provided between the touch sensor TS and the window WD.

In an exemplary embodiment of the present disclosure, the insulating member INM may be used as a supporting substrate SUB for supporting the display part PP and other constituent elements.

The window WD may be provided in a plate shape corresponding to the shape of the display part PP, and covers at least a part of a front surface of the display part PP. For example, when the display part PP is provided in a rectangular shape, the window WD may also be provided in a rectangular shape corresponding to the rectangular shape of the display part PP. Otherwise, when the display part PP is provided in a circular shape, the window WD may also be provided in a circular shape corresponding to the circular shape of the display part PP.

The window WD allows an image from the display part PP to pass through and absorbs and disperses external impacts, thereby preventing the display part PP from being damaged or erroneously operated by the external impact. The term "external impacts" refers to force exerted from the outside, such as pressure and stress, and means force causing a defect to the display part PP.

The entirety or at least a part of the window WD may have flexibility. For example, the window WD may have flexibility in an entire area, or may have flexibility in an area corresponding to a flexible area.

A material of the window WD may be selected from the materials of the substrate SUB. The window WD may be formed of, for example, glass or a polymer resin. In an exemplary embodiment of the present disclosure, when the window WD is glass, the window WD may be chemically tempered glass. In an exemplary embodiment of the present disclosure, when the window WD is a polymer resin, the window WD may be formed of polyurethane.

The window WD may be provided with various thicknesses. The window WD may be provided with different thicknesses according to a material so as to have flexibility having a predetermined curvature, or so as to not have flexibility.

Further, the window WD may be transparently or semi-transparently implemented so as to secure minimum amount of predetermined transparency, or may also be opaquely implemented in at least a partial area according to a disposition structure with respect to the display part PP and the like.

In the present exemplary embodiment, although not illustrated, a pressure sensitive adhesive may be interposed between the respective constituent elements, for example, between the touch sensor TS and the insulating member, or the insulating member and the window WD. Even in the exemplary embodiments discussed below, although not illustrated, a pressure sensitive adhesive may be provided between constituent elements, or the illustrated pressure sensitive adhesive may be removed as necessary.

Figure 10:
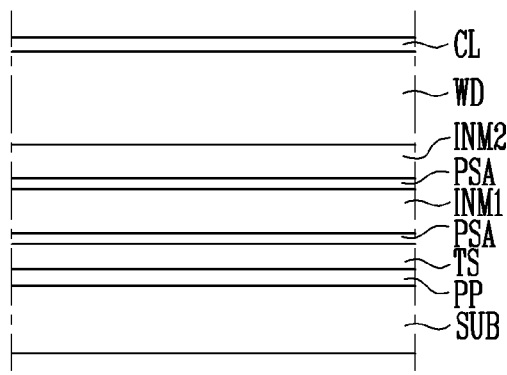

Referring to FIG. 10, a display device according to an exemplary embodiment of the present disclosure may include a substrate SUB, a display part PP provided on the substrate SUB, a touch sensor TS provided on the display part PP, an insulating member INM having multiple layers provided on the touch sensor TS, a window WD provided on the insulating member INM, and a conductive layer CL provided on the window WD.

In an exemplary embodiment of the present disclosure, the insulating member may be provided with multiple layers. That is, the insulating member may include a first insulating member INM1 and a secondi insulating member INM2 sequentially laminated on the touch sensor TS. The insulating member is provided with the multiple layers, so that flexibility of the display device may be increased. A material of the insulating member has been described above, but in the present exemplary embodiment, the insulating member may be a polyimide film. That is, each of the first and second insulating members INM1 and INM2 may be formed of polyimide.

Each of the first and second insulating members INM1 and INM2 may be provided with a thickness of about 50 μm or less or about 30 μm or less.

A pressure sensitive adhesive PSA may be provided between the touch sensor TS and the first insulating member INM1. A buffer layer may be provided between the first insulating member INM1 and the second insulating member INM2. The buffer layer may be formed of the pressure sensitive adhesive PSA, so that the buffer layer is indicated with the pressure sensitive adhesive PSA in FIG. 10. The pressure sensitive adhesive PSA may serve to bond the two constituent elements and disperse stress between the two constituent elements as described above. The pressure sensitive adhesive PSA may have various thicknesses.

Figure 11:
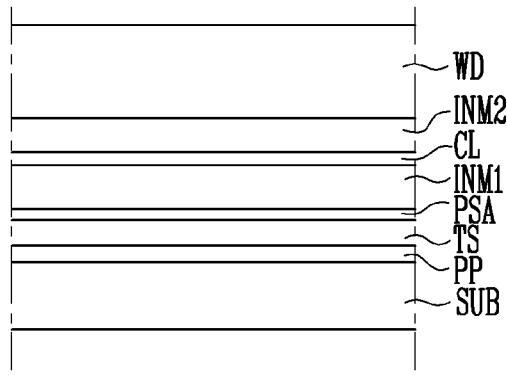

Referring to FIG. 11, a display device according to an exemplary embodiment of the present disclosure may include a substrate SUB, a display part PP provided on the substrate SUB, a touch sensor TS provided on the display part PP, a first insulating member INM1 provided on the touch sensor TS, a conductive layer CL provided on the first insulating member INM1, a second insulating member INM2 provided on the conductive layer CL, and a window WD provided on the second insulating member INM2. A pressure sensitive adhesive PSA may be provided between the touch sensor TS and the first insulating member INM1.

The present exemplary embodiment differs from the aforementioned exemplary embodiments in that the conductive layer CL is provided between the insulating member formed of the multiple layers, not in an outermost layer. That is, the window WD is not disposed between the display part PP and the conductive layer CL, but is disposed on the conductive layer CL.

The conductive layer CL may be provided between the first insulating member INM1 and the second insulating member INM2, instead of the pressure sensitive adhesive PSA. In an exemplary embodiment of the present disclosure, the conductive layer CL may include a conductive polymer, and the conductive polymer may have adhesiveness.

In the present exemplary embodiment, the first insulating member INM1, the conductive layer CL, the second insulating member INM2 may be sequentially formed, the touch sensor TS may be formed on the second insulating member INM2, and the touch sensor TS may be disposed on the display part PP.

As described above, the conductive layer CL may not be directly provided on a surface, on which a touch of a user is made, and may be provided between other constituent elements. For example, the conductive layer CL in the present exemplary embodiment is provided between the first insulating member INM1 and the second insulating member INM2, but in another exemplary embodiment, the conductive layer CL may also be provided between the second insulating member INM2 and the window WD. In yet another exemplary embodiment, the conductive layer CL may also be provided at various positions, that is, between an anti-reflecting layer ARL, which is to be described below, and a window WD, or between an insulating member and an anti-reflecting layer ARL.

Figure 12:
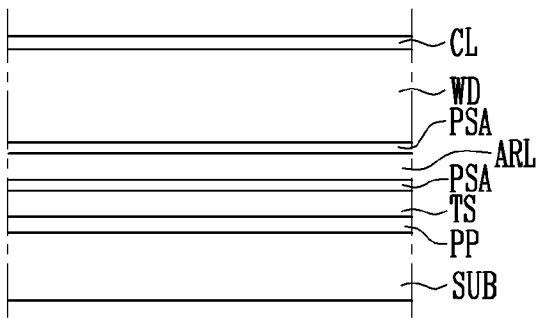

Referring to FIG. 12, a display device according to an exemplary embodiment of the present disclosure may include another constituent element, for example, an anti-reflecting layer ARL preventing external light from being reflected. For example, the display device of the present disclosure may include a substrate SUB, a display part PP provided on the substrate SUB, a touch sensor TS provided on the display part PP, an anti-reflecting layer ARL provided on the touch sensor TS, a window WD provided on the anti-reflecting layer ARL, and a conductive layer CL provided on the window WD. A pressure sensitive adhesive PSA may be provided between the touch sensor TS and the anti-reflecting layer ARL, and the anti-reflecting layer ARL and the window WD.

The anti-reflecting layer ARL serves to restrict external light reflection by offsetting and extinguishing light introduced from the outside. The anti-reflecting layer ARL may be implemented by a polarizer, and may be provided in a single layer or multiple layers. For example, the anti-reflecting layer ARL may be provided in a single layer, which circularly polarizes incident light, or multiple layers including a ¼ wavelength phase retardation layer.

The anti-reflecting layer ARL may be provided in various forms, and is not particularly limited. For example, when the anti-reflecting layer ARL is provided with a polarizer, the anti-reflecting layer ARL may be provided in the form of an elongated polymer film, or in the form of a wire grid polarizer. Otherwise, the anti-reflecting layer ARL may also be provided in a form of a liquid crystal polarizer.

The anti-reflecting layer ARL may be provided with various thicknesses. For example, in an exemplary embodiment of the present disclosure, the anti-reflecting layer ARL may have a thickness of about 150 µm or less, about 60 µm or less, or about 40 µm or less.

Figure 13:
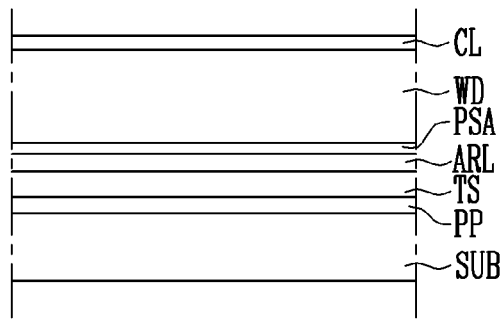

Referring to FIG. 13, in a display device according to an exemplary embodiment of the present disclosure, an anti-reflecting layer ARL may be provided as a separate constituent element, for example, in a form of a film, and attached within the display device, but is not limited thereto, and may be directly formed on another constituent element within the display device. For example, the display device of the present disclosure may include a substrate SUB, a display part PP provided on the substrate SUB, a touch sensor TS provided on the display part PP, an anti-reflecting layer ARL provided on the touch sensor TS, a window WD provided on the touch sensor TS, and a conductive layer CL provided on the window WD. The anti-reflecting layer ARL is not attached by using a pressure sensitive adhesive and the like, but may be directly formed on the touch sensor TS.

In the present exemplary embodiment, a pressure sensitive adhesive PSA may be provided between the window WD and the anti-reflecting layer ARL.

Figure 14:
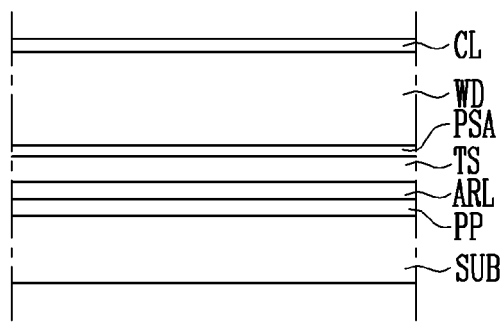

Referring to FIG. 14, in a display device according to an exemplary embodiment of the present disclosure, positions of some of the constituent elements of the display device may be changed. For example, in an exemplary embodiment of the present disclosure, unlike the aforementioned exemplary embodiments, the positions of a touch sensor TS and an anti-reflecting layer ARL may be reversed. That is, the display device according to an exemplary embodiment of the present disclosure may include a substrate SUB, a display part PP provided on the substrate SUB, an anti-reflecting layer ARL provided on the display part PP, a touch sensor TS provided on the anti-reflecting layer ARL, a window WD provided on the insulating member INM, and a conductive layer CL provided on the window WD.

In the present exemplary embodiment, a pressure sensitive adhesive PSA may be provided between the window WD and the touch sensor TS.

Figure 15:
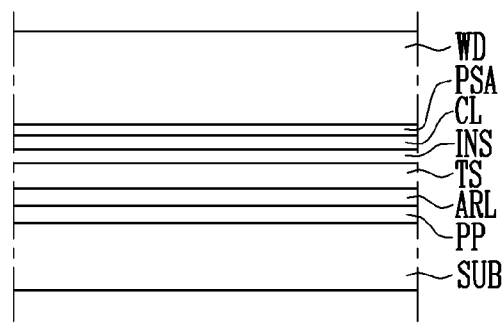

Referring to FIG. 15, in a display device according to an exemplary embodiment of the present disclosure, a position of a conductive layer CL among the constituent elements of the display device may also be changed. For example, the conductive layer CL may be provided at a lower side, not an upper side of a window WD, and may be directly provided on a display part, without being separately attached by using a pressure sensitive adhesive. When the conductive layer CL is provided on the display part PP, an insulating layer INM for blocking electrification may be interposed between the conductive layer CL and the display part PP. The insulating layer INS may be omitted as necessary. That is, the display device according to an exemplary embodiment of the present disclosure may include a substrate SUB, the display part PP provided on the substrate SUB, an anti-reflecting layer ARL provided on the display part PP, a touch sensor TS provided on the anti-reflecting layer ARL, a conductive layer provided on the touch sensor TS with the insulating layer INS interposed therebetween, and the window WD provided on the conductive layer CL.

In the present exemplary embodiment, a pressure sensitive adhesive PSA may be provided between the window WD and the anti-reflecting layer ARL.

Figure 16:
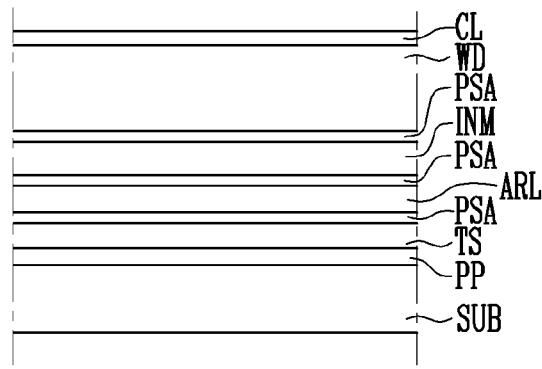

Referring to FIG. 16, a display device according to an exemplary embodiment of the present disclosure may include a substrate SUB, a display part PP provided on the substrate SUB, a touch sensor TS provided on the display part PP, an anti-reflecting layer ARL provided on the touch sensor TS, an insulating member INM provided on the anti-reflecting layer ARL, a window WD provided on the insulating member INM, and a conductive layer CL provided on the window WD.

In an exemplary embodiment of the present disclosure, pressure sensitive adhesives PSA may be provided between the touch sensor TS and the anti-reflecting layer ARL, the anti-reflecting layer ARL and the insulating member INM, and the insulating member INM and the window WD, and some of the pressure sensitive adhesive PSA may also be omitted.

In the present exemplary embodiment, any one of multiple layers of insulating member INM may be replaced with the anti-reflecting layer ARL. Further, in the present exemplary embodiment, the insulating member INM may have a form including a hard coating layer.

Figure 17:
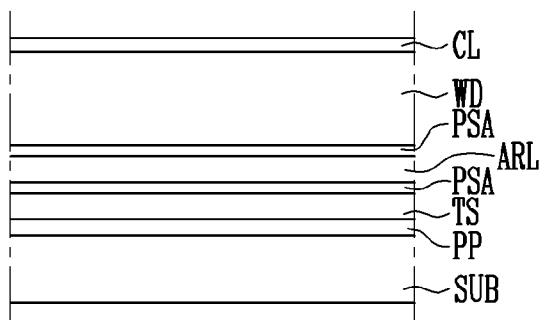

Referring to FIG. 17, a display device according to an exemplary embodiment of the present disclosure may include a substrate SUB, a display part PP provided on the substrate SUB, a touch sensor TS provided on the display part PP, an anti-reflecting layer ARL provided on the touch sensor TS, a window WD provided on the anti-reflecting layer ARL, and a conductive layer CL provided on the window WD. A pressure sensitive adhesive PSA may be provided between the anti-reflecting layer ARL and the window WD and between the anti-reflecting layer ARL and the touch sensor TS.

In the present exemplary embodiment, the display device may not have flexibility, and may be provided with a larger thickness than those of other exemplary embodiments.

The display device according to an exemplary embodiment of the present disclosure has improved touch sensitivity compared to the display device in the related art, so that hereinafter, an effect of the present disclosure will be described with reference to FIGS. 18A to 18C, and FIGS. 19A and 19B.

Figure 18A:
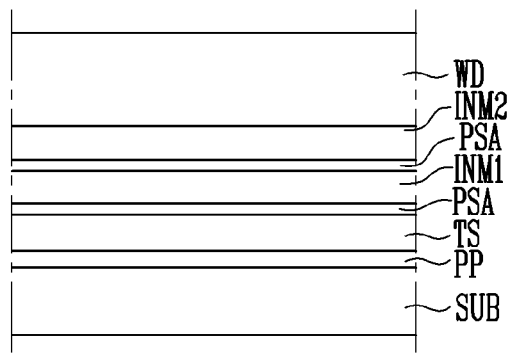
FIG. 18A is a cross-sectional view of Comparative Example 1 illustrating a display device in the related art.
Figure 18B:
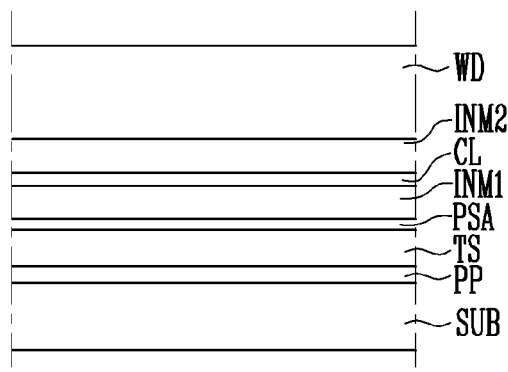
FIG. 18B is a cross-sectional view of Example 1 illustrating a display device according to an exemplary embodiment of the present disclosure.
Figure 18C:
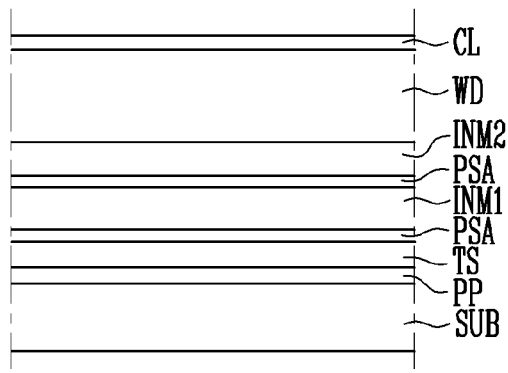
FIG. 18C is a cross-sectional view of Example 2 illustrating a display device according to an exemplary embodiment of the present disclosure.

FIG. 18A is a cross-sectional view of Comparative Example 1 illustrating a display device in the related art, FIG. 18B is a cross-sectional view of Example 1 illustrating a display device according to an exemplary embodiment of the present disclosure, and FIG. 18C is a cross-sectional view of Example 2 illustrating a display device according to an exemplary embodiment of the present disclosure.

In Comparative Example 1, Example 1, and Example 2, the substrates SUB, the display parts PP, and the touch sensors TS are provided under the same conditions, so that separate descriptions thereof will be omitted. In Comparative Example 1, the display device was manufactured by sequentially laminating a pressure sensitive adhesive PSA, a first insulating member INM1, the pressure sensitive adhesive PSA, a second insulating member INM2, and a window WD on a touch sensor TS. In Example 1, the display device was manufactured by sequentially laminating a pressure sensitive adhesive PSA, a first insulating member INM1, a conductive layer CL, a second insulating member INM2, and a window WD on a touch sensor TS. In Example 2, the display device was manufactured by sequentially laminating a pressure sensitive adhesive PSA, a first insulating member INM1, the pressure sensitive adhesive PSA, a second insulating member INM2, a window WD, and a conductive layer CL on a touch sensor TS. The conductive layer CL was formed of PEDOT:PSS, and surface resistance of the conductive layer CL was 109 Ω/sq. In Comparative Example 1, Example 1, and Example 2, each window WD was manufactured of polyurethane.

Table 1 below represents intensities of a detection signal ΔC1/C1 detected by the sensor control units in the display devices of Comparative Example 1, Example 1, and Example 2. Each value was indicated with a predetermined unit. A first point in the table below is a value obtained by selecting and measuring any one point in a portion closest to the sensor control unit (the printed circuit board PB) when the display device is divided into three portions in a direction of a long side, and a second point is a value obtained by selecting and measuring any one point in a portion farthest from the sensor control unit.

TABLE 1

|  | Comparative Example 1 | Example 1 | Example 2 |
|---|---|---|---|
| First point | 197 | 518 | 482 |
| Second point | 0 | 175 | 192 |

Referring to Table 1, in a case of the Comparative Example, in which the conductive layer is not provided, the detection signal has a value larger than 0 at the first point close to the sensor control unit, so that it is possible to recognize a touch of a user, but the detection signal has a value of 0 at the second point far from the sensor control unit, so that it is difficult to recognize a touch of a user.

However, according to Examples 1 and 2, both the first point and the second point represent the detection signals considerably larger than that of Comparative Example 1, and particularly, the second point represents the values of 175 and 192, so that it can be seen that the intensity of the detection signal is greatly increased. Accordingly, the display device according to an exemplary embodiment of the present disclosure may recognize a touch of a user in an entire area regardless of an area of the touch sensor.

Figure 19A:
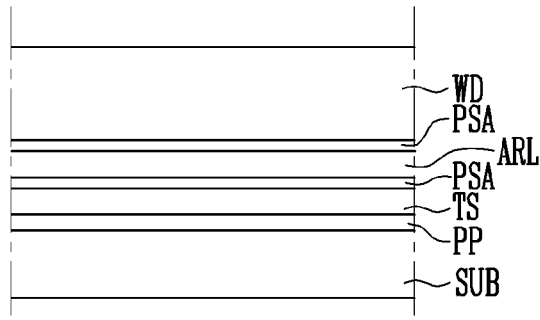
FIG. 19A is a cross-sectional view of Comparative Example 2 illustrating a display device in the related art.
Figure 19B:
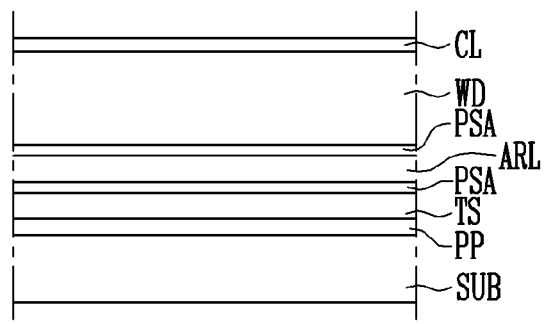
FIG. 19B is a cross-sectional view of Example 3 illustrating a display device according to an exemplary embodiment of the present disclosure.

FIG. 19A is a cross-sectional view of Comparative Example 2 illustrating the display device in the related art, and FIG. 19B is a cross-sectional view of Example 3 illustrating the display device according to an exemplary embodiment of the present disclosure.

In Comparative Example 2 and Example 3, the substrates SUB and the display parts PP are provided under the same conditions, so that separate descriptions thereof will be omitted. In Comparative Example 2, the display device was manufactured by sequentially laminating a pressure sensitive adhesive PSA, an anti-reflecting layer ARL, a pressure sensitive adhesive PSA, and a window WD on a touch sensor TS. In Example 3, the display device was manufactured by sequentially laminating a pressure sensitive adhesive PSA, an anti-reflecting layer ARL, the pressure sensitive adhesive layer PSA, a window WD, and a conductive layer CL on a touch sensor TS. The conductive layer CL was formed of PEDOT:PSS, and surface resistance of the conductive layer CL was 109 Ω/sq. In Comparative Example 2 and Example 3, each window WD was manufactured of super-thin glass.

Table 2 below represents intensities of a detection signal ΔC1/C1 detected by the sensor control units in the display devices of Comparative Example 2 and Example 3. Each value was indicated with a predetermined unit.

TABLE 2

|  | Comparative Example 2 | Example 3 |
|---|---|---|
| First point | 409 | 737 |
| Second point | 134 | 205 |

Referring to Table 2, in a case of the Comparative Example 2, in which the conductive layer is not provided, the detection signal has a value larger than 0 at both the first point and the second point, so that it is possible to recognize a touch of a user, but the detection signal has a much small value at the second point far from the sensor control unit. Accordingly, recognition sensitivity for a touch of a user is decreased.

However, according to Example 3, both the first point and the second point represent the detection signals considerably larger than that of Comparative Example 1, so that it can be seen that the intensity of detection signal is considerably increased. Accordingly, in the display device according to an exemplary embodiment of the present disclosure, it can be seen that the recognition of a touch of a user is considerably increased in an entire area regardless of an area of the touch sensor.

Comparative Example 3 and Example 4 are the cases where the display device disclosed in FIGS. 19A and 19B is used, but only a thickness of a cover layer within the display part PP is increased.

Table 3 below represents intensities of a detection signal ΔC1/C1 detected by the sensor control units in the display devices of Comparative Example 3 and Example 4. Each value was indicated with a predetermined unit.

TABLE 3

|  | Comparative Example 3 | Example 4 |
|---|---|---|
| First point | 819 | 1552 |
| Second point | 519 | 929 |

Referring to Table 3, in a case of the Comparative Example 3, in which the conductive layer is not provided, the detection signal has a value larger than 0 at both the first point and the second point, so that it is possible to recognize a touch of a user, but the detection signal has a much small value at the second point far from the sensor control unit. Accordingly, recognition sensitivity for a touch of a user is decreased.

However, according to Example 4, both the first point and the second point represent the detection signals considerably larger than that of Comparative Example 1, so that it can be seen that the intensity of detection signal is considerably increased. Accordingly, in the display device according to an exemplary embodiment of the present disclosure, it can be seen that the recognition of a touch of a user is considerably increased in an entire area regardless of an area of the touch sensor.

In the display device according to an exemplary embodiment of the present disclosure having the aforementioned structure, at least a part of the display device may be flexible or may not be flexible. In order for the display device to have flexibility, the constituent elements, for example, the display part or the window, included in the display device, may also separately have flexibility. For example, the display device may have a flexible area having flexibility and/or a rigid area having no flexibility according to a degree of flexibility. When the display device has flexibility, the display device may be foldable, and when it is assumed that a virtual line, along which the display device is folded, is a folding line, the folding line may be provided within the flexible area.

The term "foldable" means that a form is not fixed, but is transformable from an original form to another form, and includes a case where the display device is foldable or bendable along one or more specific lines, that is, the folding lines, and is bendable in a curve form or is rollable in a roll shape. Accordingly, the display device has flexibility within the flexible area, but may not be folded or may be actually folded.

In relation to the flexible area and the rigid area, the terms "having flexibility" or "having no flexibility", and "flexible" or "rigid" are terms relatively representing a property of the display device. That is, the expressions "having no flexibility" and "rigid" include a case where the area has flexibility, but has lower flexibility than that of the flexible area, as well as a case where the area has no flexibility and is rigid. Accordingly, the rigid area has a relatively lower flexibility than that of the flexible area or has no flexibility, and even under a condition in which the flexible area is folded, the rigid areas may not be folded.

In an exemplary embodiment of the present disclosure, the folding line, the flexible area, or the rigid area may be variously changed. For example, the display device may have both the rigid area and the flexible area, but may have only the flexible area, without the rigid area. Further, a single folding line may be provided, but the folding line is not limited thereto, and may be provided in plural. Further, in this case, the folding lines may be provided at various positions as necessary, and the whole folding lines may also be rolled in a roll type.

Figure 20:
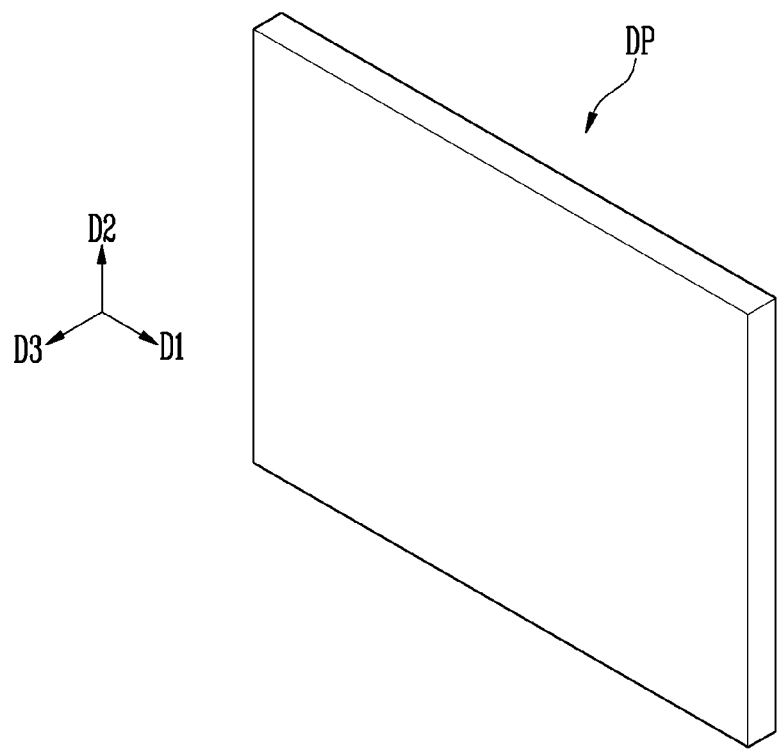
FIG. 20 is a perspective view illustrating a display device according to an exemplary embodiment of the present disclosure.
Figure 21A:
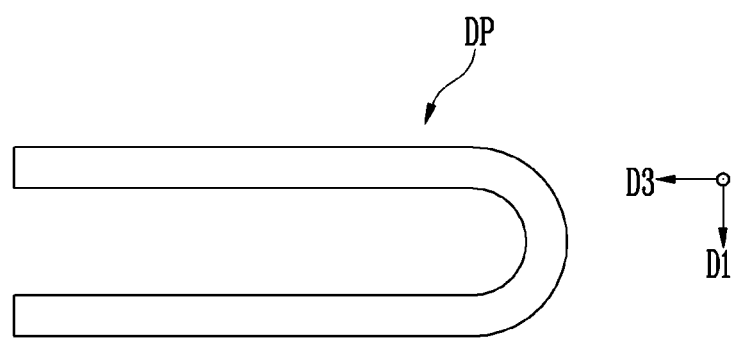
FIG. 21A is a cross-sectional view illustrating a state where the display device of FIG. 20 is folded.
Figure 21B:
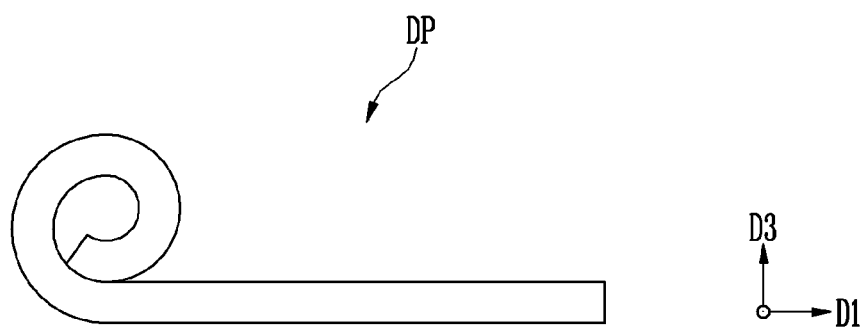
FIG. 21B is a cross-sectional view illustrating a state where the display device of FIG. 20 is rolled.

FIG. 20 is a perspective view illustrating a display device according to an exemplary embodiment of the present disclosure, FIG. 21A is a cross-sectional view illustrating a state where the display device of FIG. 20 is folded, and FIG. 21B is a cross-sectional view illustrating a state where the display device of FIG. 20 is rolled.

A display device DP may be provided in a flat state as illustrated in FIG. 20, but at least a part of the display device may be transformed and provided in a state having another shape.

Referring to FIGS. 21A and 21B together with FIG. 20, at least a part of the display device DP of the present disclosure may have flexibility, and an entire display device DP may have flexibility. Since the display device DP has flexibility, the display device DP may be folded or rolled in an area having flexibility, as illustrated in FIG. 21A and FIG. 21B.

A folding line, along which the display device DP is folded, may pass through a center of the display device DP and be parallel to a second direction D2. However, a position of the folding line is not limited thereto, and may be provided in a direction parallel to the first direction D1, and an may be provided in an oblique direction to a first direction D1 or the second direction D2. Further, the folding line need not pass through the center of the display device DP. In addition, when the display device DP is folded along the folding line, the display device DP may be folded so that a front surface, on which an image is displayed, becomes an internal side, or a front surface, on which an image is displayed, becomes an external side. Otherwise, when the display device DP is folded along the plurality of folding lines, a part of the display device DP is folded so that the front surface becomes an internal side, and the other part of the display device DP is folded so that the front surface becomes an external side.

A non-described symbol reference numeral D3 means a third direction perpendicular to both the first direction and the second direction.

The display device DP may be rolled so that one surface thereof faces the other surface. The direction, in which the display device DP is rolled, may be the first direction D1 or the second direction D2. However, the rolling direction is not limited thereto, and may be an oblique direction with respect to the first direction D1 or the second direction D2. Otherwise, in the display device DP, the rolled area may be a part of the display device, and an entire area of the display device DP may also be rolled.

The display device according to an exemplary embodiment of the present disclosure may be applied to various electronic devices. For example, the display device may be applied to a television, a notebook computer, a mobile phone, a smart phone, a smart pad (PD), a Portable Multimedia Player (PDP), a Personal Digital Assistant (PDA), a navigation device, various wearable devices, such as a smart watch, and the like.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display device, comprising:
a substrate;
a first electrode disposed on the substrate;
an emission layer on the first electrode;
a second electrode on the emission layer;
a capacitive touch sensor disposed on the second electrode; and
a conductive layer disposed on the capacitive touch sensor,
wherein:
the capacitive touch sensor comprises a plurality of touch electrodes having a mesh form;
the touch electrodes comprise a first touch electrode and a second touch electrode;
the second touch electrode is spaced apart from the first touch electrode and forms a capacitance with the first touch electrode;
a second capacitance is formed between the second electrode and the touch electrodes;
a third capacitance is formed between the conductive layer and the touch electrodes; and
one of the first and second touch electrodes is a driving electrode, and the remaining one of the first and second touch electrodes is a receiving electrode.

2. The display device of claim 1, further comprising a sensor control unit to receive corresponding values of a capacitance between the touch electrodes and a variation of the capacitance between the touch electrodes,
wherein the variation of the capacitance between the touch electrodes is changed by a capacitance between the touch electrodes and the conductive layer and by a capacitance between the touch electrodes and the second electrode when a touch is made by a user.

3. The display device of claim 1, wherein the conductive layer has a surface resistance in a range of $10^5$ Ω/sq to $10^9$ Ω/sq.

4. The display device of claim 3, wherein the conductive layer has a thickness in a range of 100 Å to 2,000 Å.

5. The display device of claim 3, wherein the conductive layer comprises a conductive polymer.

6. The display device of claim 5, wherein the conductive polymer comprises at least one of polythiophene, polypyrrole, polyaniline, polyacetylene, polyphenylenether, and a mixture thereof.

7. The display device of claim 6, wherein the conductive polymer is PEDOT:PSS.

8. The display device of claim 1, further comprising a window disposed between the touch sensor and the conductive layer.

9. The display device of claim 8, wherein the window is formed of glass or a polymer resin.

10. The display device of claim 8, further comprising an anti-reflecting layer disposed between the touch sensor and the conductive layer.

11. The display device of claim 8, further comprising an insulating layer disposed between the touch sensor and the window.

12. The display device of claim 11, wherein the insulating member comprises a first insulating member and a second insulating member, which are sequentially laminated on the touch sensor.

13. The display device of claim 1, further comprising a window disposed on the conductive layer.

14. The display device of claim 13, further comprising an insulating member disposed between the conductive layer and the window.

15. The display device of claim 1, wherein the display device has flexibility.

16. A display device, comprising:
a display part comprising a display unit configured to display an image, and a first electrode and a second electrode configured to control a display of an image of the display unit;
a capacitive touch sensor disposed on the display part, the capacitive touch sensor comprising a plurality of touch electrodes having a mesh form; and
a conductive layer disposed on the capacitive touch sensor,
wherein:
the touch electrodes comprise a first touch electrode and a second touch electrode;
the second touch electrode is spaced apart from the first touch electrode and forms a capacitance with the first touch electrode;
a second capacitance is formed between the second electrode and the touch electrodes;
a third capacitance is formed between the conductive layer and the touch electrodes; and
one of the first and second touch electrodes is a driving electrode, and the remaining one of the first and second touch electrodes is a receiving electrode.

17. A display device, comprising:
a display part comprising a display unit configured to display an image, and one or more electrodes configured to control a display of an image of the display unit;
a capacitive touch sensor disposed on the display part and configured to detect a touch of a user;
a conductive layer disposed on the capacitive touch sensor; and
a sensor control unit configured to receive corresponding values of a first capacitance of the capacitive touch sensor and a variation of the first capacitance of the capacitive touch sensor,
wherein:
the capacitive touch sensor comprises a first touch electrode and a second touch electrode; the second touch electrode is spaced apart from the first touch electrode and forms the first capacitance with the first touch electrode;
one of the first and second touch electrodes is a driving electrode, and the remaining one of the first and second touch electrodes is a receiving electrode; and
the variation of the first capacitance is changed by a third capacitance between the capacitive touch sensor and the conductive layer and by a second capacitance between the capacitive touch sensor and one of the electrodes of the display part when a touch is made by a user.

18. The display device of claim 17, wherein the display part comprises:
a first electrode disposed on a substrate;
an image displaying layer disposed on the first electrode; and
a second electrode disposed on the image displaying layer.

* * * * *